United States Patent [19]

Snodgrass

[11] Patent Number: 4,970,672
[45] Date of Patent: Nov. 13, 1990

[54] DATA PROCESSING SYSTEM, AND KEYPAD ASSEMBLY FOR INPUTTING DATA IN SUCH SYSTEM

[75] Inventor: Hiram R. Snodgrass, Chapel Hill, N.C.

[73] Assignee: Innovative Computer Solutions, Chapel Hill, N.C.

[21] Appl. No.: 301,663

[22] Filed: Jan. 25, 1989

[51] Int. Cl.⁵ ............................................... G06F 3/02
[52] U.S. Cl. ................................. 364/709.12; 33/1 M
[58] Field of Search .............. 364/709.12, 555, 710.12; 341/22; 235/146; 400/473, 718; 40/371, 352; 340/710; 33/1 M

[56] References Cited

U.S. PATENT DOCUMENTS

| | | | |
|---|---|---|---|
| 3,892,958 | 7/1975 | Tung | 364/709.15 |
| 4,159,836 | 7/1979 | Tarr | 40/352 |
| 4,336,598 | 6/1982 | Yanagawa | 364/710.12 |
| 4,581,761 | 2/1986 | Ichinokawa | 340/710 |
| 4,639,547 | 1/1987 | Jacob-Grinschgl | 33/1 M |
| 4,831,736 | 5/1989 | Bryant, Sr. | 33/1 M |
| 4,852,055 | 7/1989 | Lapeyre | 340/710 |

OTHER PUBLICATIONS

Advertisement, "Numerikeys Allows PC, Laptop Users to Enter Numbers More Easily," Genest Technologies Inc., Santa Ana, Calif.
Product brochure, "SigmaScan TM Measurement System for Your IBM PC . . . Designed by Scientists for Scientists," Jandel Scientific, Corte Madera, Calif.
Advertisement from May–Jun. 1990 issue of *American Scientist*, p. 197, "Save Yourself a Lot of Trouble", Jandel Scientific.

*Primary Examiner*—David M. Malzahn
*Attorney, Agent, or Firm*—Olive & Olive

[57] ABSTRACT

A data entry keypad assembly, comprising a keypad including an array of keys, and a positioning locator secured to the keypad to form a unitary keypad assembly therewith, whereby the keypad assembly is selectively positionable at a desired locus of a data field to permit accurate inputting of data by the keypad to a digital computer operatively coupled therewith. Data processing systems comprising a digital computer operatively connected to such keypad assembly are disclosed, together with a source code computer program operatively associable with a digital computer of a type employing an MS-DOS, or compatible, operating system, and arranged to actuate audio signal generating means, to provide audio feedback indicative of a specific key of the keypad being actuated, and to assist in minimizing data entry inputting errors. The keypad assembly, computer software, and data processing system of the invention have particular utility to the inputting of primary DNA nucleotide sequence data from autoradiograms into a digital computer for storage and retrieval, and/or processing thereof.

9 Claims, 4 Drawing Sheets

|   |   |   |   |
|---|---|---|---|
| A | C | G | T |
| N | U | ← | → |
| <BS> | / | NL | <CR> |

FIG. 4

|   |   |   |   |
|---|---|---|---|
| 0 | 1 | 2 | 3 |
| 4 | 5 | 6 | 7 |
| 8 | 9 | NL | <CR> |

FIG. 5

DATA PROCESSING SYSTEM, AND KEYPAD ASSEMBLY FOR INPUTTING DATA IN SUCH SYSTEM

BACKGROUND OF THE INVENTION

1. Field of The Invention

The present invention generally relates to information processing systems for processing of alpha-numeric data from data fields comprising same, and in a specific aspect relates to a keypad assembly for sequentially inputting data from a data field external to the information processing system.

2. Description of The Related Art

In a wide variety of business and technical fields, alpha-numeric data from data fields is inputted to a digital computer or other data processing system, for storage and subsequent retrieval, and/or for algorithmic manipulation and calculation purposes, etc. In such applications, particularly where the source field of alpha-numeric data is extensive, it frequently is difficult for the data entry operator to input the data in a highly accurate manner, particularly where the data field is complex and involves spatial arrays or strings of data which must be sequentially inputted.

The problems of accurate data inputting in such applications derive from the simple matter of "keeping one's place" in the data field, and remembering the data, as the data is visually discerned and inputted, and as the data input operator's eyes subsequently turn toward the screen to visually check the inputted data, against the remembered value or character previously discerned.

Once the data in inputted, the data input operator must return to the data field and to the subsequent point in the data field following the datum for which the inputting operation was just completed. Unless the data field is marked (e.g., checked off) with respect to the data at the time of inputting at the keyboard of the digital computer or data processing system, there is the risk that the data input operator may return to an incorrect place in the data field. An incorrect data entry then is made with adverse effects on the data processing system's operation. The error may be propagated in subsequent data entries, and may in certain instances even preclude the desired objective of the data inputting operation from being achieved.

In addition to the foregoing problems associated with "loss of place" in the data field during the data entry operation, there is also a possibility of inputting errors resulting from misreading of the data. Such errors are also frequently compounded by the tendency of the data entry operator to look at the data, and then to look at the screen to verify the inputting of the datum that is perceived.

Such inputting errors are further increased when the data field is embodied in a form which necessitates its placement at a position remote from the keyboard, so that it is necessary for the data entry operator to physically move or shift position in order to view the data and thereafter to key in the data on the keyboard of the digital computer or other data processing system.

An illustrative application field exemplifying the foregoing data entry inputting problems is the field of molecular biology research. In such field, primary deoxyribonucleic acid (DNA) sequence data derived from autoradiograms is inputted to computers. Another data input operation in molecular biology research is the inputting of published DNA sequence data into computers, or other data processing systems, for analysis. Such inputting of published sequence data has become commonplace, due to the long time delays typically involved between initial publication of a DNA sequence, and its availability in commercial DNA sequence databases.

The foregoing DNA sequence inputting procedures are laborious, time-consuming, and typically prone to the occurrence of numerous errors in the inputted sequence.

Other areas in which large volumes of (numerical) data are entered, include accounting, bookkeeping, attendance recordkeeping, test scoring, consumer testing, and use and analysis of various other population, demographic, and statistical data.

Accordingly, it would be a substantial advance in the art to provide a data processing system, which is adapted for inputting of data from data fields comprising same, by means and in a manner which significantly decreases the likelihood of inputting errors, and increases inputting speed, relative to previously employed data processing systems.

Accordingly, it is an object of the present invention to provide such an improved data processing system, for inputting data from a data field comprising same.

It is another object of the present invention to provide an interfacial input means and method for inputting data from a data field into a digital computer such as a standard personal computer (PC).

It is still another object of the present invention to provide a data processing system and data entry subsystem therefor, which is constructed and arranged for inputting of DNA sequence data for storage and retrieval, and/or other processing thereof.

Other objects and advantages will be more fully apparent from the ensuing disclosure and appended claims.

Relative to the data processing system and data entry assembly of the present invention, as hereinafter described, the relevant art includes keyboards and keypad structures of the prior art. There is presently commercially available from Genest Technologies Inc. (Santa Ana, Calif.) a 33-key "mini keyboard," intended for add-on numeric keypad supplementation of a keyboard of laptop and desktop personal computers. This mini keyboard, which is commercialized under the tradename "Numerikeys," is designed to facilitate spreadsheet work on laptop computers. This mini keyboard features separate keys for cursor control, math functions, and page movement functions. The number keys double as function keys in this device, which connects to a parallel port of the personal computer through a pass-through plug which is said to be non-interfering with respect to printing by the personal computer system. This keypad unit is advertised to be portably light weight, and to be $4\frac{1}{2} \times 9 \times \frac{3}{4}$ inches in size.

SUMMARY OF THE INVENTION

In one aspect, the present invention relates to a data entry keypad assembly comprising a keypad including an array of manually actuatable keying elements, with a positioning locator means secured to the keypad to form a unitary stucture therewith which may be physically (manually) translated about the data field, to selectively place the keypad assembly in a specific location, in alignment with the datum to be inputted.

The positioning locator may for example comprise a viewing window, with which is associated a marker element allowing the data entry operator to pinpoint a discrete datum in the data field during the data entry operation.

In a further embodiment of the keypad assembly described above, the assembly may comprise audio signal generating means for generating a predetermined tone, word, or other sound, concurrently with the keying of a selected key in the array, and with different tones, words or sounds associated with each of the selected keys in the array of keying elements, to provide an auditory feedback as a proofreading means for minimizing the incidence of inputting errors.

In a related aspect, the keypad assembly of the invention comprises a signal transmission cable joined to the keypad at one end and joined at a second end to a port attachment means for attaching the keypad assembly to an asynchronous port in the data processing system, e.g., a personal digital computer.

Another aspect of the invention relates to a computer program for sequentially inputting data from a keypad of the aforementioned type. In a specific embodiment of the invention, this computer program accommodates the function of inputting DNA sequence data.

Still another aspect of the invention relates to an information processing system comprising a keypad assembly of the above described type, and having operatively associated therewith a computer program of the above-described type.

Other aspects and features of the invention will be more fully aparent from the ensuing disclosure and appended claims.

BRIEF DESCRIPTION OF THE DRAWINGS

FIG. 4 is a schematic depiction of the keypad according to one embodiment of the present invention, showing the keying elements thereof as representing a first character set.

FIG. 5 is a schematic depiction of the keypad of the invention corresponding to FIG. 4, but modified to represent a second character set by the keying elements, by number-locking of the keypad.

DETAILED DESCRIPTION OF THE INVENTION, AND PREFERRED EMBODIMENTS THEREOF

Figure 1:
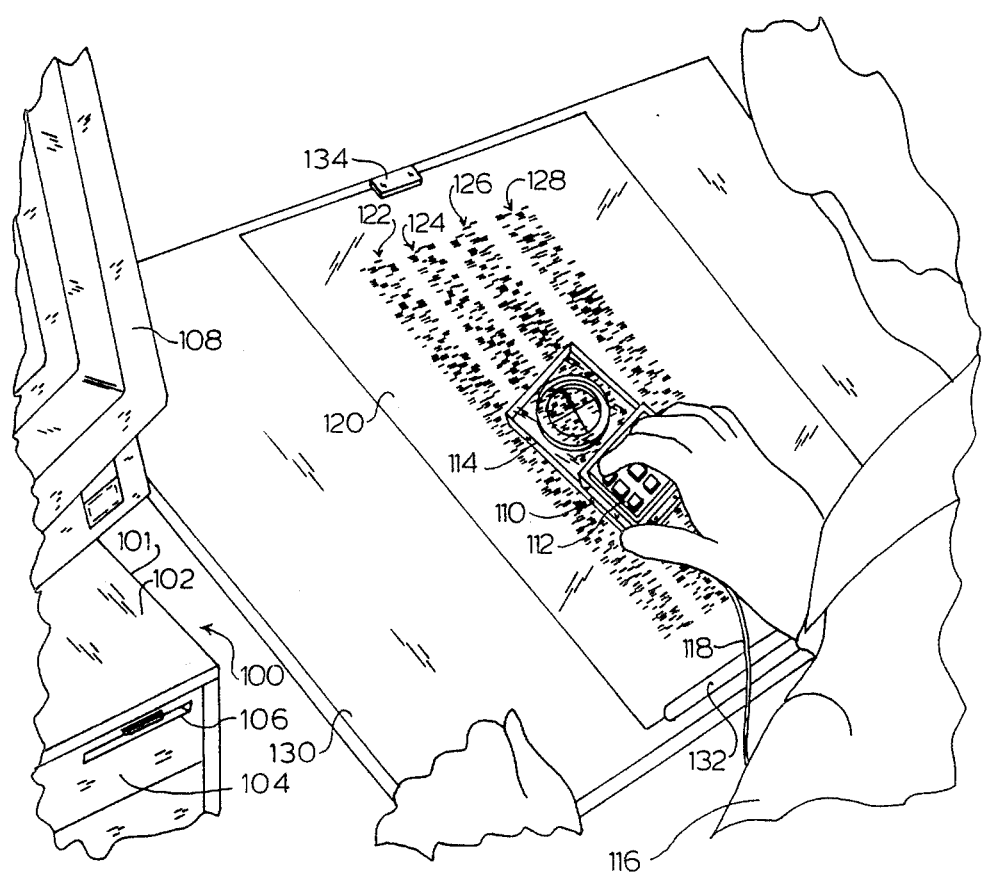
FIG. 1 is a perspective view of a data processing system according to one embodiment of the present invention, as employed to input DNA sequence data from an autoradiogram disposed on a light table, into a digital computer.

The data entry keypad of the present invention is a PC-adaptable keypad with an attached data viewing window featuring marker means, such as for example cross hairs, for positioning the viewing window on the data to be entered into memory, storage, buffer, or other central processing unit (CPU) components of a data processing system comprising the keypad assembly.

The keypad of the present invention facilitates rapid and easy manual keying entry of alpha-numeric data from a data field into a digital personal computer or other data processing apparatus. As used herein, the term "alpha-numeric data" refers to data which may be alphabetic and/or numeric in character, as well as to data which may be embodied in or represented by other symbols, characters, or tangible elements of expression.

The keypad of the invention is particulary suited for applications where the data exist in long sequences of alpha-numeric characters, including data strings of alphabetic characters representing DNA nucleotide constituents of a specific DNA molecule which is being studied. The keypad of the invention greatly increases the speed of data entry. Concomitantly, it promotes reduction in the number of keying errors incident to transfer of data, from a data field external to the data processing system, to the storage and/or computing components of the data processing system.

A primary application area to which the keypad of the invention is adaptable, is molecular biology research involving the inputting of primary DNA sequence data derived from autoradiograms, into personal computers, as well as copying of published nucleotide sequences of DNA molecules into personal computer files for analysis.

Accordingly, the invention in its various aspects will be described more fully hereinafter with reference to such molecular biology applications, however it is to be appreciated that the utility of the invention is not thus limited, but rather extends to other fields of endeavor, such as those illustratively mentioned above, including accounting, bookkeeping, statistical sampling, etc.

Referrring now to FIG. 1, there is shown a data processing system 100 which includes a digital personal computer 101 comprising a CPU 102 having a frontal face 104 provided with a slot 106 for insertion therein of a floppy disk comprising the computer program hereinafter described, as the source code application software for the keypad assembly.

The digital personal computer 101 further comprises a monitor 108 for visual display of data, prompts, screens, and other displays normally provided as visual output in the operation of the computer system.

Although described hereinafter with particular reference to a digital personal computer, it will be appreciated that the information processing system of the invention may instead comprise other computer or processor means, such as minicomputers, mainframe computers, supercomputers, and microprocessor and optical disk storage and processing systems.

Asynchronously ported to the CPU of the digital computer system is a keypad assembly 110 comprising a keypad 112 and a positional locator portion 114. The keypad assembly 110 is sufficiently small in size so that it is manually graspable and translatable by manual movement of the hand of the data entry operator 116.

Figure 2:
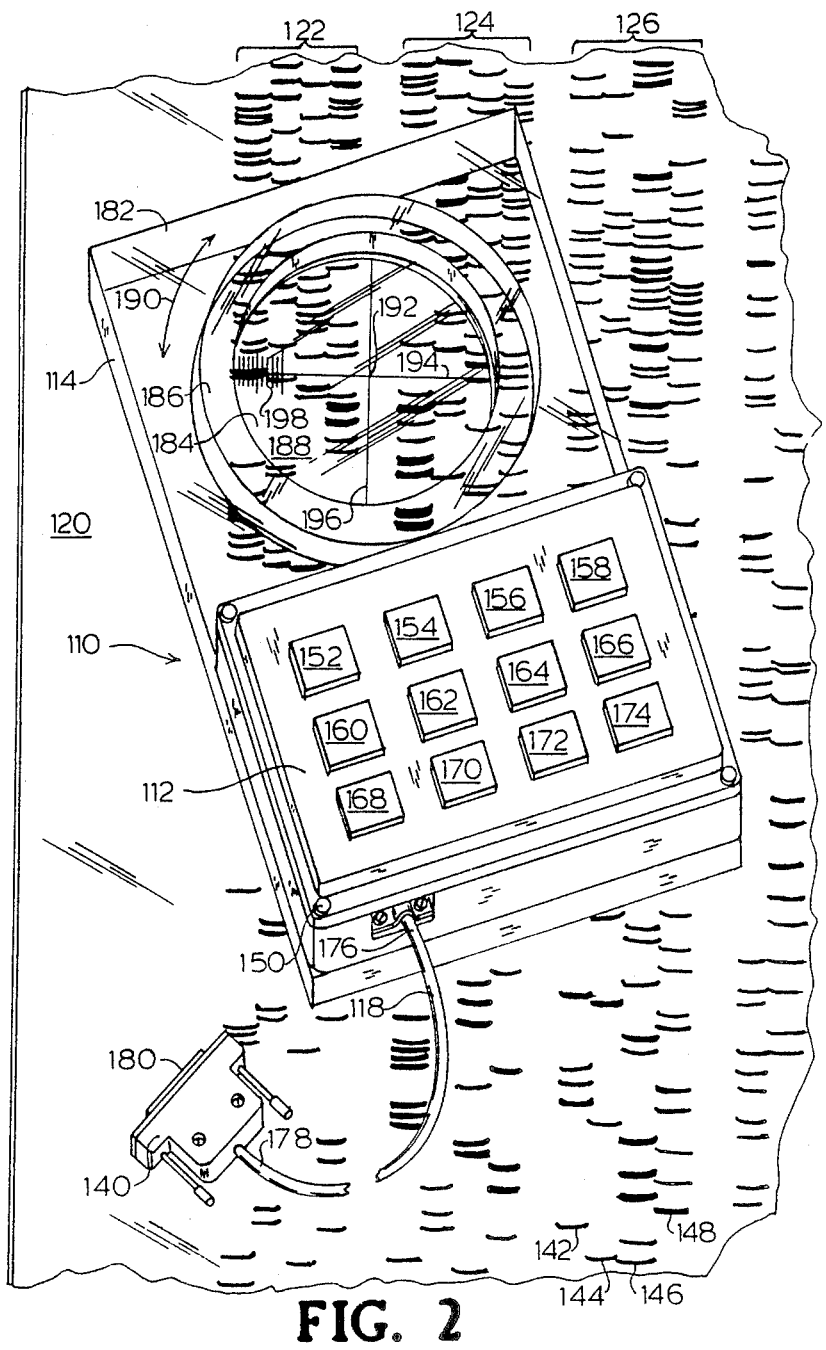
FIG. 2 is a perspective view of a keypad assembly according to the present invention, reposed on an autoradiogram.

As shown, the keypad assembly 110 has connected thereto a signal transmitting means 118, which may for example comprise a coaxial electrical cable which is joined at one end to the keypad assembly and is joined at the other end to a plug assembly (as shown in FIG. 2, described hereinafter) rendering it plug-compatible with the asynchronous port of the digital personal computer 101.

In the illustrative perspective view of FIG. 1, the keypad assembly 110 is shown reposed on an autoradiogram 120 comprising a series of "tracks" 122, 124, 126, and 128. Each of these tracks contains four vertically extending bands respectively corresponding to the four nucleotides adenine, cytosine, guanine, and thymine, which are recurrently present in molecules of DNA. The nucleotide bands are produced in transversely adjacent fields on the autoradiogram in a known manner, via conventional molecular biology nucleotide sequencing techniques.

The autoradiogram 120 is positioned on a light table 130 having an illuminated planar top surface, and provided with suitable clips or other retention means 132 and 134 at its upper and lower margins, for retention of the autoradiogram in the desired position on the top surface of the light table.

FIG. 2 is a perspective view of the keypad assembly 110 shown in FIG. 1, including the asynchronous port-compatible plug 140 thereof. For ease of reference, FIG. 2 has been numbered correspondingly with respect to FIG. 1, as regards the same or corresponding system elements.

The keypad assembly shown in FIG. 2 is reposed on the autoradiogram 120 displaying the nucleotide tracks 122, 124, 126 and 128 thereon. With reference to track 124, as representative of each of the constituent tracks illustrated, there are shown constituent nucleoside bands 142, 144, 146, and 148, corresponding to adenosine, cytidine, guanosine, and thymidine, respectively. In the further description herein, these respective bases will be denoted by the respective symbols A, C, G, and T, as conventionally employed in the fields of molecular biology, and biotechnology generally.

As shown, the keypad 112 may comprise a suitable housing 150, on the top surface of which are mounted an array of keys, or keying elements, 152, 154, 156, 158, 160, 162, 164, 166, 168, 170, 172, and 174. These keys are manually actuatable by finger pressure, with the keypad being manually operated as shown in FIG. 1. Joined to the housing 150 of keypad 112 is a first end 176 of coaxial cable signal transmission means 118. The signal transmission means at a second, opposite end 178 thereof is joined to the connector plug 140. The frontal portion 180 of the connector plug is suitably configured to mate with an array of pin connector elements of an asynchronous part of a personal computer such as is shown in FIG. 1 whereby the connector plug 140 is rendered couplingly compatible with the asynchronous port.

Also joined to the housing 150 of keypad 112 is the positional locator portion 114 of the keypad assembly 110. The positional locator portion 114 may for example comprise a generally planar base 182 having flat top and bottom surfaces, with the top surface of the base having mounted thereon the housing 150. The keypad assembly 110 thus has an overall flat bottom surface and may be unitarily reposed on a planar substrate such as the autoradiogram 120.

Mounted in a central opening of the base structure 182 is a rotatable viewing port 184 comprising a rotatable collar 186 to which is joined a generally planar port window 188.

The rotatable collar 186 of the viewing port 184 is manually graspable along its periphery so as to be rotatable in either of the directions indicated by bi-directional arrow 190. In this manner, the viewing port window 188 is rotatable to align the intersection point 192 of the cross hairs 194 and 196 with a selected track element of a selected A, C, G, or T band of the nucleotide track.

As is well known in the art of DNA sequence analysis, the autoradiogram track is read in analyzing the sequence represented thereby, by the process of starting at the bottom of a track and, while advancing vertically upwardly along the track, discerning visually which of the transversely adjacent track elements in the respective A, C, G, and T bands is "next" in the sequence, i.e., which track element is most closely vertically adjacent to a given lower track element. In this manner, by progressing vertically from a given track element to the next closest vertically ajacent track element, and recording the symbol of the base represented by the respective track element, a nucleotide sequence corresponding to the DNA molecule being studied is assembled, e.g., a sequence such as CCAGTACCGTA.

In such fashion, the marker elements comprising cross hairs 194 and 196, and their associated intersection point 192, provide a means of quickly and reliably focusing the data entry operator's attention on a specific track element, which then may be inputted by manually depressing the appropriate one of the keys 152-174 in the array of keying elements, to generate a signal indicative of the appertaining nucleotide symbol, which then is transmitted by the signal transmission means 118 and plug 140 to the asynchronous port of the digital computer, for storage and/or processing therein.

The rotatable character of the viewing port 184 is of particular advantage, in that it accommodates a variety of angular orientations relative to the person of a wearer. Thus, the cross hairs of the viewing port may be selectively angularly positioned consistent with the position of the hand, arm, and/or body of the data entry operator (see FIG. 1). It will be recognized that the positional locator portion 114 alternatively may comprise stationary cross hairs on a simple plate of transparent character, without the provision of a viewing port as above described.

In instances where the positional locator portion 114 of the keypad assembly 110 comprises a planar plate or similar base structure, the segment thereof which is intended to be superpositioned on the data field will be of a suitably transparent character, to accommodate visually guided selective positioning of the positional locator at a desired point in the data field being inputted by the keypad assembly.

It will be recognized that other forms of the positional locator portion 114 of the keypad assembly may be employed, of substantially different character than the planar base and viewing port structure described above. For example, the positional locator may comprise a "gun sight" type of positional locator element, having a small-sized notch or other alignment structure which is selectively positionable on a data field, to positionally indicate the data element which is being inputted to the data processing system comprising the keypad assembly.

The viewing port 184 and base 182 of the positional locator portion 114 of the keypad assembly may be formed of any suitable material accommodating the requirements of the visually guided positional locator. For example, the window 184 and base 182 may be formed of plexiglass, or polycarbonate, or other substantially transparent material allowing visual alignment of the keypad assembly with the datum being inputted. In general, polycarbonate is a preferred material of construction for the window 184, due to its superior optical characteristics. Similarly, the housing 150 and keying elements 152-174 of the keypad may be formed of any suitable material of construction, as for example polypropylene, polysulfone, polystyrene, etc.

As shown in FIG. 2, the cross hair 194 of the viewing port 184 may have associated therewith a Vernier scale 198, to permit measurements to be made which are important to the DNA base sequence interpretation. Autoradiogram tracks of nucleotide sequences typically comprise track elements in the respective A, C, G, and T bands which in many cases vertically overlap one or more track elements of the other respective A, C, G, or T bands, to a greater or lesser degree. In such instances, it frequently is difficult to determine which track element in the respective bands is the "next" element in the sequence. For this purpose, a Vernier scale 198 is imprinted on the window 184 in association with the cross hair 194. The Vernier scale permits measurement of the respective track element-to-element distances, thus facilitating the visual identification of the next track element in the nucleotide sequence. It will be appreciated that the use of the Vernier scale 198 in the system illustratively shown in FIG. 2 will require the rotation of the window 184 to a position which is approximately 90° in a clockwise direction from that shown in the drawing, in order that the scale markings of the Vernier scale are properly aligned with the track elements in the bands being studied.

The keypad assembly 110 and associated data processing system 100 described hereinabove with reference to FIGS. 1 and 2 hereof greatly increases the speed of data entry, and drastically reduces the number of errors occurring in the data entry process while inputting data into the data processing system 100 from a source of data which is external to the data processing system.

The keypad assembly 110 preferably is small in size, as for example having a length of 116 millimeters and a width of 76 millimeters. The keypad assembly 110 thus may be placed directly on the data to be entered, when such data is for example in the form of an X-ray film or a printed page of data.

Such superpositioning of the keypad assembly 110 on the data field eliminates the wasted motion by the data entry operator of moving back and forth from the data field to the computer keyboard. The cross-hairs 194, 196 within the viewing window 184 help to maintain exact positioning of the keypad assembly during data entry. Further, the keypad can be constructed and arranged as hereafter described, to provide a unique sound serving as an auditory feedback proof-reading function, to additionally minimize the incidence of errors during the data entry operation.

In application to molecular biology applications involving entry of nucleotide sequences of DNA molecules, the top row of keys 152, 154, 156, and 158 of the 12-key array illustratively shown in the embodiment of FIGS. 1 and 2, can be configured as nucleoside symbols (A, C, G, and T), while the cross-hairs 194, 196 of the viewing window are employed to maintain the proper position of the keypad assembly 110 in the nucleotide field, or printed base sequence, during data entry.

The keypad keys 152–174 may also be customized, as hereinafter described, to include specific commands and/or functions, so that the keypad becomes an integrated data entry and command tool, in combination with a specific software program comprising source code for the specific data entry compilation and/or processing operation to be carried out by the data processing system 100.

For example, in addition to configuring the keypad for inputting DNA nucleotide sequence data, the keypad assembly 110 can be configured for inputting protein amino acid sequence data. If, for example, each of the keys 152–174 of the keypad 112 shown in FIG. 2 is arranged to selectively represent one of two possible characters, then with the 12 keys provided, all of the 21 single amino acid species can be represented.

With respect to personal computer applications of the present invention, the PC systems with which the keypad assembly 110 of the invention may be employed include those featuring an asynchronous communication port for receiving of the keypad-inputted data. Specific examples of PC systems to which the keypad assembly is adaptable include the IBM ® XT ™, AT ™, and PS/2 ™ computer systems, commercially available from International Business Machines Corporation (Armonk, N.Y.). and so-called "IBM-compatible" personal computers, as well as the Compaq Deskpro 386 ™ computer, commercially available from Compaq Computer Corporation (Houston, Tex.) and the NEC APC IV ™ computer, available from NEC Corporation. (In each of these computer systems, the operating system MS-DOS ™ 2.X or above, or other compatible operating systems, may advantageously be employed.

In the aforementioned computer systems and illustrative operating system, the keypad assembly 110 and associated software (as hereafter more fully described) are compatible with a wide variety of other applications software programs, except for those utilities which "take over" the normal keyboard of the PC system.

One example of such exception is the software commercially available under the trademark "SideKick" from Borland International Inc. (Scotts Valley, Calif.). Such type of keyboard-controlling application software programs should not be loaded during use of the keypad assembly hardware and software of the present invention as illustratively described herein, however such hardware and software may be modified to accommodate such keyboard-controlling application software programs, without adverse effect.

To install the keypad assembly 110 illustratively shown in FIG. 2 in the aforementioned computer systems, the plug 140 is attached to the COM1 or COM2 asynchronous port (not shown) of the computer, so that the keypad assembly is joined in communications transmission relationship with the PC 101. The application software computer program described hereinafter then functions as a driver allowing the keypad to function as an additional keyboard for the PC 101. Such augmented data processing system allows the rapid entry of data directly to the CPU 102 of the PC 101, with almost any applications software which "runs" on the PC 101, so that data entered at the keypad 102 and transmitted from the keypad to the PC 101 is equivalent to normal keyboard input, and as such is completely transparent to the other applications software utilized in the system.

Figure 3:
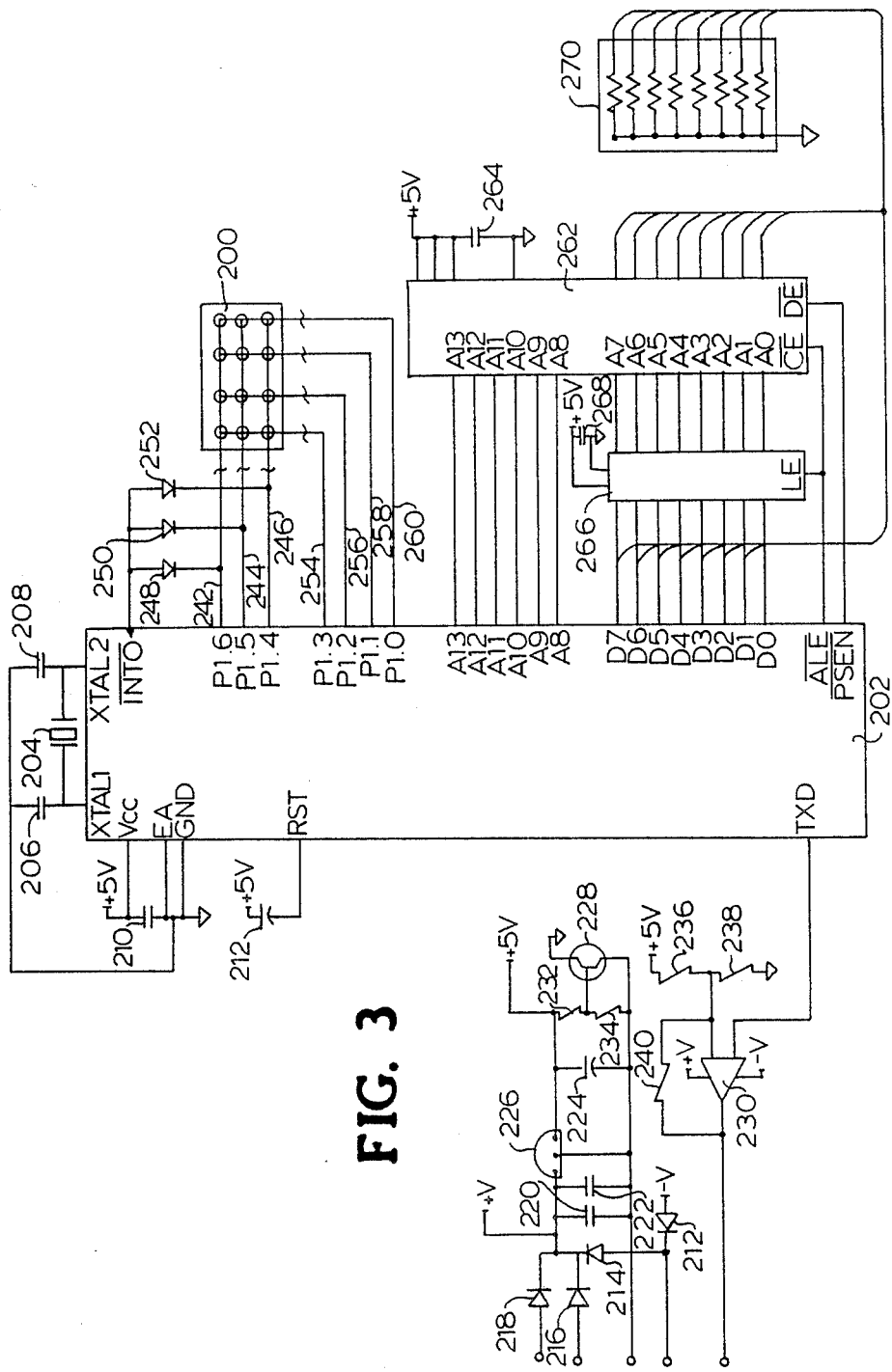
FIG. 3 is a schematic circuit diagram of circuitry which may be usefully employed in the keypad of the present invention, in one embodiment thereof.

FIG. 3 is a schematic circuit diagram for the keypad 112 illustratively shown in FIGS. 1 and 2 hereof. By the illustrated circuitry, the keypad assembly interfaces the 4×3 matrix keypad 200 with a standard RS232C asynchronous port of a PC of a type illustratively described above.

The keypad circuitry comprises a Signetics SCN80C31B 8-bit microprocessor (Signetics Corporation, Sunnyvale, Calif.) 202 having joined to its XTAL1 and XTAL2 terminals an external oscillator comprised of a crystal 204 and two 33 Pf capacitors 206 and 208. A 0.1 Mf capacitor 210 is connected to terminals $V_{cc}$ and EA of the microprocessor 202. A 1 Mf capacitor 212 is connected to terminal RST of the microprocessor.

At terminal TXD of the microprocessor 202 is provided a sub-circuit joining the microprocessor to the asynchronous port of the PC. This sub-circuit comprises diodes 212, 214, 216, and 218, capacitors 220 (10 Mf), 222 (0.1 Pf), and 224 (0.1 Mf), a 5-volt regulator 226 (National Semiconductor Inc., Sunnyvale, Calif), transistor 228, operational amplifier 230, and resistors 232 (3.32K ohm), 234 (590 ohm), 236 (100K ohm), 238 (39K ohm), and 240 (1M ohm), arranged as illustrated.

The receiving lines 242, 244, and 246 from the keypad 200, joined respectively to the P 1.6, P 1.5, and P 1.4 terminals of the microprocessor, are also connected to the INTO terminal of the microprocessor with respective diodes 248, 250, and 252 therebetween.

The scanning lines 254, 256, 258, and 260 from the keypad 200 are joined to the microprocessor terminals P 1.3, P 1.2, P 1.1, and P 1.0, respectively.

A Signetics EPROM 262 is connected to the microprocessor 202 at the respective corresponding terminals A8, A9, A10, A11, A12, and A13 thereof. Also joined to the EPROM 262 as shown is a capacitor 264 (0.1 Mf).

Interposed between the EPROM 262 and the microprocessor 202 is a Signetics SCN74HC373 8-bit latch 266 as shown, the 8-bit latch having associated therewith a capacitor 268 (0.1 Mf), and being coupled at terminal LE thereof to the connector line joining terminal ALE of microprocessor 202 and terminal CE of the EPROM 262. Finally, the terminal DE of EPROM 262 is connected to terminal PSEN of the microprocessor 202. Connected between the EPROM 262, 8-bit latch 266, and microprocessor 202, as shown, is a 47K ohm resistor pack (Dale Electronics Inc., Columbus, Nebr.) 270.

The keypad assembly in a simple form may be constituted as a plate of a suitably optically transparent material such as plexiglass, on the positional locator portion of which is inscribed cross-hairs, and with the keypad housing attached, such as by self-tapping screws, or other mechanical fastener means, to such plate.

The application software computer program employed for operation of the keypad assembly is a memory resident driver and is interrupt activated. Upon receiving the appropriate interrupt from the asynchronous port, the software suspends all other applications software, retrieves a character from the asynchronous port, places it in a standard keyboard BIOS buffer, and optionally generates a tone by means of software utilizing the PC speaker as output, or by generating a sound by means of a voice generator hardware associated with the keypad and characteristic of the specific inputted character. The software updates the keyboard buffer status to indicate that a character is waiting for inputting, and resumes operation at the point at which the interrupt occurred. The software is self-detecting with respect to its own presence and will not install in the data processing system if a working copy already has been loaded.

At any time, the output from the keypad can be modified for any character or control codes recognized by the specific PC system employed, by modifying the translation table within the software computer program. This is accomplished by a prompt driven sub-routine which allows for the keys to be redefined, and the audio signal to be selectively activated or deactivated, as well as allowing such changes to be temporary or permanent in nature. Making the changes permanent modifies the disk version of the software computer program. The software allows recognition of the shift or "number lock" state of the computer keyboard, as hereinafter described, such that each key of the keypad can input two different characters, depending on the shift or number lock state of the computer keyboard at a given point in time. The number lock state of the computer keyboard can be toggled from the keypad.

It will be appreciated that in lieu of powering the keypad assembly via the asynchronous card, the keypad may be configured with a self-contained power source, in association with appropriate circuitry therefor. For example, the keypad may comprise CMOS microcircuitry which can be powered by a conventional 9-volt battery. Further, the keypad may suitably be configured to utilize the parallel, as opposed to the asynchronous, port of the computer as a means of communicating with the PC with which the keypad is employed.

In the use of the keypad assemblies shown in FIGS. 1 and 2 and comprising the circuitry shown in FIG. 3, the operation of the data processing system comprising such keypad is illustratively described below.

As indicated, the plug 140 of the keypad assembly 110 is attached to the PC 101 at the COM1 or COM2 asynchronous port. There are two alternative installation procedures, depending on whether a floppy disk or hard disk configuration is to be utilized.

In the following procedural description relating to the use of an illustrative keypad assembly embodiment of the invention, the characters to be entered are enclosed by quotation marks, but such quotation marks are only intended to demarcate the appertaining instructions, commands, etc., and are not themselves entered. Some of the keys of the main keyboard associated with the installation of the keypad assembly and associated software, e.g., the "Carriage Return" or "Enter" keys, are indicated within angle brackets "< >".

Once the software (described more fully hereinafter) is installed, it remains available until the computer system is turned off or the keypad software is uninstalled.

If a floppy disk configuration is employed for the PC system, the disk comprising the keypad application software is inserted into drive A. At the keyboard, the instruction "A: DataPad" is keyed in followed by the command "<ENTER>". The keypad application software thereby is installed, and ready for use.

If a hard disk configuration is employed for the PC with which the keypad assembly is associated, the keypad application software is copied into a convenient directory. In the ensuing illustrative example, the root directory is utilized for this purpose.

The keypad application software disk is installed into drive A of the PC CPU. The instruction "COPY A:*.* C:" is keyed in at the PC's main keyboard, followed by the command "<ENTER>". Next, the instruction "C:DataPad" is inputted at the keyboard, followed by the command "<ENTER>". For ease of subsequent use, this command can be placed in the "AUTOEXEC.BAT" file to automatically install the keypad application software.

Upon completion of the foregoing procedure, the keypad application software is ready for use.

Once the keypad application software has been installed as described above, the keypad can be utilized as an additional keyboard. The keypad assembly then is placed on the data to be entered, with the cross-hairs being utilized to align and maintain the position of the keypad assembly during data entry.

There are two readily accessible "character sets" for the keypad. One character set is active until the "Number-lock" key is pressed, either on the keypad or the PC main keyboard. The "Number-lock" status light, a feature which is present on newer enhanced PC keyboards, can be used as an indicator of the character set status of the keypad.

Figures 4, 5:
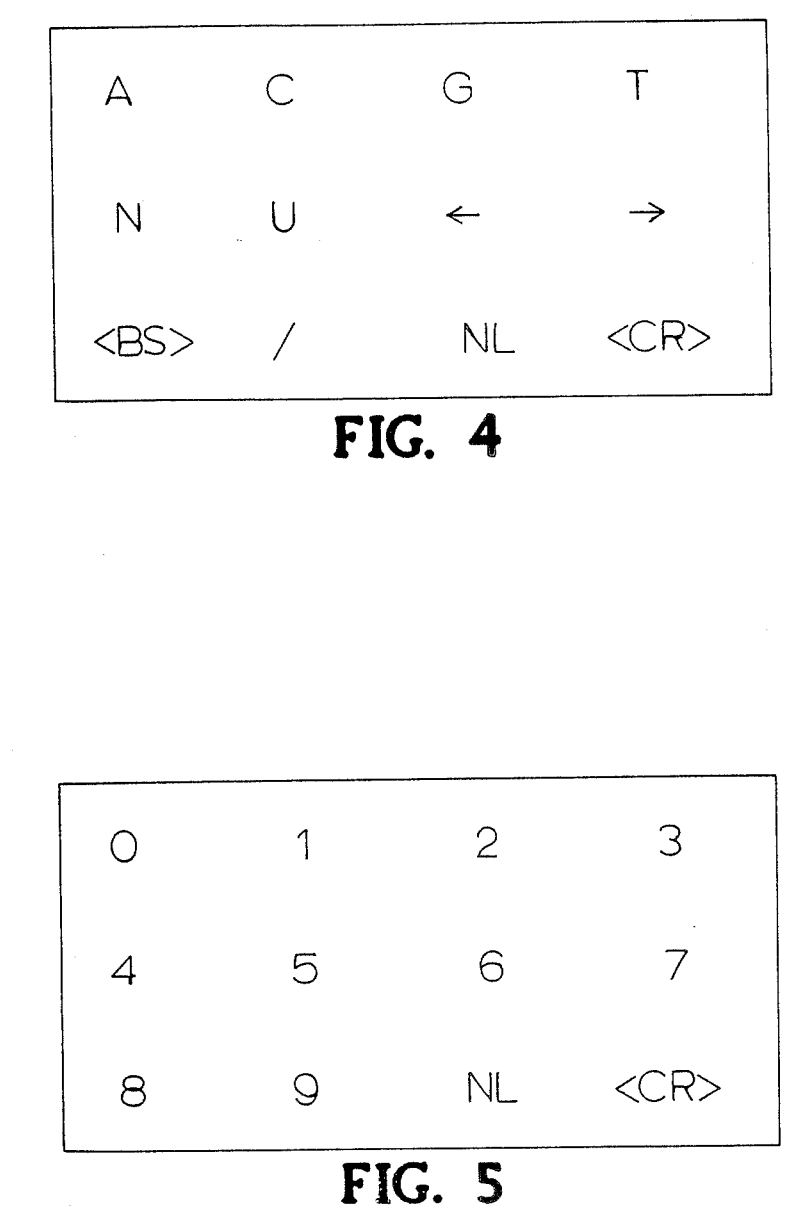

The two keypad character sets may be selectively alternatively, configured as shown in FIG. 4 hereof ("Normal Character" set) in a first character set operating mode, or as shown in FIG. 5 hereof ("Number-Locked Character" set) in a second character set operating mode. For these character set operating modes, the keying characters of each set are defined below in Table I.

TABLE I

| | |
|---|---|
| ← | <Left arrow> on the number pad of the keyboard |
| → | <Right arrow> on the number pad of the keyboard |
| <BS> | <Backspace> key |
| / | <Forward slash> key |
| NL | "Number-Lock" which toggles between the two character sets |
| <CR> | <Carriage return> or <Enter> key |

All of the above keys, including the "Number-Lock" key, can be renamed to other characters or functions specifically appropriate for different applications, as described below.

The sound (audio signal) keying feature can be toggled on or off by depressing the <Ctrl> key on the PC main keyboard and pressing the "O" or "A" key on the keypad.

The keypad software can be uninstalled at any time by typing "DATAPAD /U" or "DATAPAD /2U" depending on which asynchronous port is being utilized, and "<ENTER>" at the DOS prompt. If it is not possible to remove the keypad software from memory, the keypad will be inactivated, and the message "DataPad has been Disabled" will be displayed.

As indicated above, all of the keys of both character sets can be renamed to any standard character or key. This allows the keypad to be readily customized for use with different applications software packages. The renaming of the keys is accomplished by a menu prompting procedure which is simple in character and quickly effected. During the renaming procedure, the data entry operator has the option of turning the audio signal on or off, and making the changes temporary or permanent. If the changes are not made permanent, the new key names will be in effect until the keypad is subsequently uninstalled or the machine is turned off. Once the keypad software is reloaded, the previous key names will be in effect. If the changes are made permanent, the new names will be in effect each successive time the keypad software is loaded, or until the keys are renamed.

The procedure for renaming the keypad keys will now be described, with reference to both PC floppy disk configurations and hard disk configurations.

In the floppy disk configuration, the disk comprising the keypad application software is inserted into drive A of the PC CPU. The instruction "A:DATAPAD" then is inputted at the PC keyboard, followed by the command "<ENTER>". Subsequently, the prompts appearing on the monitor screen, as generated by the keypad software, are followed.

In a hard disk configuration, it is assumed for purposes of the ensuing discussion that "C" is the default drive and that the keypad software has been copied into the root directory of drive "C:" as described hereinabove. First, the instruction "CD" is inputted, followed by the command "<ENTER>". Next, "DATA-PAD/R" is entered at the PC main keyboard, followed by the command "<ENTER>". If the keypad software is not found in the default directory, the installation will not proceed and the error message "DataPad.com not found" will be given. Once the keypad software is located, the prompts appearing on the monitor screen, as generated by the keypad software, are followed.

It will be appreciated that the audio signal, whose pitch, frequency, or other distinguishing characteristic is unique for a given key of the keypad, may be provided as a single or multitone sound, or the keypad software alternatively may be configured to provide a voice output indicative of the specific key, or any other auditory signal which is effective to identify the specific one of the array of keys which is being touched by the data entry operator at any given time, may advantageously be employed.

Such auditory signal, as mentioned, provides a feedback signal indicative of whether the desired key has been depressed by the data entry operator, thereby serving to further minimize the occurrence of errors in the data entry process.

Other optional features likewise can be employed in the keypad assembly and associated software. For example, a visual signal, such as a small LED display, may be activated to indicate the "Number-lock" status of the keypad, to enable the data entry operator to visually discern which of the respective character set modalities is then currently actuated, during the operation of the keypad.

Set out below is a keypad source code computer software program according to one embodiment of the present invention, by which the keypad assembly of the type illustrative shown and described with respect to FIGS. 1-3 hereof, may suitably be operated.

Title DataPad Communications Interface Routine
;*********************************************************************
;    (c)Copyright 1988 by Ralph Snodgrass, ALL RIGHTS RESERVED
;
;Version 1.0 (11-18-88) TSR COM1 or COM2 interrupt driver
;Character are translated and input into the BIOS keyboard buffer
;Two keyboards are available: the numerical keyboard (0-9) the 11th key is a
;   toggle to activate the other keyboard, and the 12th key is the <CR> key,
;   this keyboard is not user configurable.
;The second keyboard is user configurable, including the toggle key(s).
;
;Will not load twice, and the sound can be turned on or off at loading or
;   by "CTRL-0" (0 from the number pad).
;The RENAME function displays an image of the keypad (Datapad.pim for
;   monochrome displays, or DataPad.pic for color displays) for easy
;   renaming of the keys.
;The RENAME function allows all Ctrl, Alt, Shift key combinations.
;
;usage: DataPad      loads for first time, or re-establishes control,
;       COM1 is the default port
;       DataPad /2   installs the COM2 port
;       DataPad /(2)R    R(enaming) of keys, COM1 is the default for these
;       DataPad /(2)S    S(ound)
;       DataPad /(2)N    N(o) sound
;       Datapad /(2)X    eXchange the character sets
;       DataPad /(2)U    uninstalls or disables the COM1 program
;
;*********************************************************************

```
Display Macro    String
      Lea    DX,String              ;Address of string to display
      Doscall 9                     ;Dos Print string function
        Endm Doscall Macro    Function
      Mov    AH,Function            ;Get function in AH
      Int    21h                    ;Dos Call
        Endm Save    Macro    R1,R2,R3,R4,R5,R6,R7,R8,R9,R10
      Irp     Rx,<R1,R2,R3,R4,R5,R6,R7,R8,R9,R10>  ;repeat for each parm
      Ifnb    <Rx>                  ;If this parm not blank
      Push    Rx                    ;Save the register
      Endif                         ;End Ifnb
      Endm                          ;End Irp Restore Macro
      Irp     Rx,<R10,R9,R8,R7,R6,R5,R4,R3,R2,R1>  ;Repeat for each parm
      Ifnb    <Rx>                  ;If this parm not blank
      Pop     Rx                    ;Pop the register
      Endif                         ;End Ifnb
      Endm                          ;End Irp
      Endm                          ;End of Restore macro
      Endm                          ;End of Save Macro Saveint Macro    Interrupt,Location           ;Saves a interrupt vector
      mov     AL,Interrupt
      doscall 35h                   ;get vector from DOS
      lea     SI,Location
      mov     [SI],BX               ;save seg
      mov     [SI+2],ES             ;save offset
        Endm
```

```
Parity_err      Equ     04                      ;Parity error
Dat_aint        Equ     01                      ;Data available int
Out2            Equ     08
Rec_buf_or      Equ     02                      ;Rec buf overrun
Rts             Equ     02
Dtr             Equ     01
cr              Equ     0dh
lf              Equ     0ah _comm   Segment Para Public 'Code'
        Assume CS:_comm,DS:_comm ,ES:nothing ,SS:Nothing Org     100h                            ;Set starting point
Entry Label Near                                ;Initialization entry point
        jmp     Start                           ;Go to initialization code Sign_on label           near
        Db      cr,lf,'          DataPad Communications COM1 Driver.   Version 1.0'
        Db      cr,lf,'      (c)Copyright 1988 by H. Ralph Snodgrass, ALL RIGHTS RESERVED
        Db      cr,lf,'         Exclusive License granted to Diagnostic Devices,
Inc.',cr,lf,'$'
Old_int_vector  dd      0
Int_number      db      0Ch
Load_where      Dw      0
Divisor         Dw      48d                     ;2400 baud
Lstat           Db      0               ;Line status byte
Mask_P21        Db      10h                     ;enable IRQ4 (COM1)
Baseadr         Dw      0                       ;Comm port ? base address this
                                                ;...is set during init. by BIOS
;**********     ASYNC INTERRUPT HANDLERS
INT_HANDLER     Proc    Near
        Sti
        Save    AX,BX,DX,DS,CX
        Mov     DX,20
        Mov     AL,20
        Out     DX,AL
        Push    CS
        Pop     DS                              ;And pop it back into DS
        Mov     DX,Baseadr                      ;Get address of async port
        Inc     DX                              ;Point at...
        Inc     DX                              ;...Interrupt ID reg Int_loop Label  Near                            ;Handle interrupts loop
        In      AL,DX                           ;Get interrupt type
        Test    AL,1                            ;Any interrupt pending?
        Jnz     Int_ret                         ;No - return
        Push    DX                              ;Save DX across call
        Call    Rec_da
        Pop     DX                              ;Restore original DX
        jmp     Int_loop Int_ret Label   Near
        Restore
        Iret                                    ;Return from interrupt ;********     Receive a byte into the buffer  ********************
Rec_da Proc     Near
        Dec     DL                              ;Point to ...
        Dec     DX                              ;... data reg
        Cli                                     ;Disable interrupts
        In      AL,DX                           ;Get a byte
        Test    Lstat,Parity_err        ;Parity error this byte?
        Jz      Rec_dat_stuf                    ;No, parity OK
        Or      AL,80h                          ;Bad parity, set high bit in AL
        And     Lstat,0FFh-Parity_err   ;Turn off parity error
Rec_dat_stuf Label      Near
        cmp     Disable_flag,0
        jz      Not_disabled
        ret
```

```
Not_disabled:
        pushf
        push    bx
        push    ds
        push    ax
        push    es
        and     al,7fh
        xor     DX,DX
        mov     ES,DX                   ;setup for low memory address
        jmp     Translate
Transtable Label   Word
        DW      1E41H           ;"0" - scan and ascii codes for "A"
        DW      2E43H           ;"1" - scan and ascii codes for "C"
        DW      2247H           ;"2" - scan and ascii codes for "G"
        DW      1454H           ;"3" - scan and ascii codes for "T"
        DW      314EH           ;"4" - scan and ascii codes for "N"
        DW      1352H           ;"5" - scan and ascii codes for "R"
        DW      4B00H           ;"6" - scan and ascii codes for "LEFT ARROW"
        DW      4D00H           ;"7" - scan and ascii codes for "RIGHT ARROW"
        DW      5300H           ;"8" - scan and ascii codes for "DEL"
        DW      372AH           ;"9" - scan and ascii codes for "*"
        DW      0000H           ;":" - scan and ascii codes for "NULL"
        DW      1C0DH           ;";" - scan and ascii codes for "RETURN"
Toggle_key1 db  0Ah             ;Toggle key on the "function" keypad
Toggle_key2 db  -1
Sound_flag  db  1
Transtable_2 Label  Word
        DW      0B30H           ;"0" - scan and ascii codes for "0"
        DW      0231H           ;"1" - scan and ascii codes for "1"
        DW      0332H           ;"2" - scan and ascii codes for "2"
        DW      0433H           ;"3" - scan and ascii codes for "3"
        DW      0534H           ;"4" - scan and ascii codes for "4"
        DW      0635H           ;"5" - scan and ascii codes for "5"
        DW      0736H           ;"6" - scan and ascii codes for "6"
        DW      0837H           ;"7" - scan and ascii codes for "7"
        DW      0938H           ;"8" - scan and ascii codes for "8"
        DW      0A39H           ;"9" - scan and ascii codes for "9"
        DW      0000H           ;":" - NULL, NUMLOCK toggle
        DW      1C0DH           ;";" - scan and ascii codes for "RETURN"
Disable_flag            db      0
Uninstall_OK_flag       db      0
Translate:
        cmp     al,30h
        jge     Above_30
        jmp     No_sound
Above_30:
        cmp     AL,3bh
        jbe     Below_3b
        jmp     No_sound
Below_3b:
        sub     al,30h
        xor     bh,bh
        mov     bl,al
        shl     bx,1
        cmp     AL,0                    ;CTRL-0 turns off the sound
        jne     Skip22
        mov     AX,ES:[417h]            ;keyboard control byte
        test    AX,4h                   ;is CTRL pressed
        jz      Skip22
        xor     CS:Sound_flag,1         ;toggle sound "flag"
        jmp     No_sound
        xor     AL,AL                   ;restore AL to 0
Skip22:
        mov     CL,ES:[417h]            ;shift status bite
        test    CL,00000011b            ;are shifts active?
        jz      No_shift
        xor     CL,00100000b            ;toggle NL bite
```

```
No_shift:
        test    CL,00100000b            ;is NL active?
        jnz     Numlock
        mov     AX,Word PTR Transtable[bx]
        jmp     Output
Numlock:
        mov     AX,BX
        shr     AX,1
        cmp     AX,0ah                  ;is the input ":" with the numberlock on?
        jne     Translate_2
        call    Numlock_toggle
        mov     AH,250d                 ;tone for toggle key
        jmp     No_toggle Translate_2:
        mov     AX,Word PTR Transtable_2[bx]

Output: push    BX
        push    AX                      ;this routine stuffs characters
        mov     AX,40h                  ;into the BIOS keyboard buffer
        mov     DS,AX
        pop     AX
        xor     BX,BX
        mov     BL,byte ptr ds:[1ch]    ;the end of buffer
        mov     word ptr ds:[bx],ax
        call    inc_buff
        mov     byte ptr ds:[1ch],bl    ;update the end
        sti                             ;reenables interrupts
        pop     BX                      ;pointer to Transtable
        mov     CX,ES:[417h]            ;shift status bite
        test    CX,100000b              ;numlock ??
        jnz     No_toggle
        shr     BX,1
        cmp     BL,CS:Toggle_key1       ;this key toggles the NUMLOCK
        je      Go_toggle
        cmp     BL,CS:Toggle_key2       ;this key toggles the NUMLOCK
        jne     No_toggle
Go_toggle:
        call    Numlock_toggle
        mov     AH,250d                 ;tone for toggle key
No_toggle:
        mov     BL,CS:Sound_flag
        or      BL,BL
        jz      No_sound
;the next three set up the freq for sound signals
        mov     BX,10                   ;arbitrary factory which separates the tones
        mov     AL,AH
        xor     AH,AH
        mul     BX
        mov     BX,450h                 ;shifts the frequency up
        add     AX,BX                   ;AX now contains freq divisor
        call    Sound
No_sound:
        pop     es
        pop     ax
        pop     ds
        pop     bx
        popf
        Ret                             ;Return to caller
Rcve2   Label   Near
        Sti                             ;Enable interrupts again
        Or      Lstat,Rec_buf_or        ;Set overrun
        Ret                             ;And return to caller Rec_da  Endp
;*************************************
```

```
Numlock_toggle   proc    near
        xor     CX,100000b              ;AL = shift status byte
        mov     ES:[417h],CX            ;mask numlock
        ret
Numlock_toggle   endp
;*********************************

Inc_buff         proc    Near
        cmp     bl,3ch                  ;is it at the end?
        je      End_buffer
        inc     bl
        inc     bl
        ret
End_buffer:      mov             bl,1eh
                 ret
Inc_buff Endp
INT_HANDLER     Endp
;********************************************************

SOUND           proc    near
        PUSH    AX                      ;save freq divisor
        MOV     AL, 0B6H                ;Set up timer
        OUT     43H, AL
        POP     AX                      ;Load freq divisor
        OUT     42H, AL
        MOV     AL, AH
        OUT     42H, AL
        IN      AL, 61H                 ;Read port 61H
        MOV     AH, AL                  ;Save its contents
        OR      AL, 3
        OUT     61H, AL                 ;Enable timer and AND gate
        MOV     CX, 3064H                   ;Delay counter for an IBM PC
DELAY:  NOP                                 ;5064 gives a 25msec delay
        NOP
        LOOP    DELAY
        MOV     AL, AH                  ;Restore port 61H
        OUT     61H, AL
        RET
SOUND           endp Res_end  Equ    $                       ;Resident code ends here ;********      Initialization routine     ****************************
Start Proc  Near                        ;Initialization code
        push    ES
        mov     AX,40h                          ;BIOS
        mov     ES,AX
        mov     AX,ES:[0]                       ;address of COM1
        pop     ES
        cmp     AX,0
        jne     C1_avail
        lea     DX,No_com_message
        Doscall 9                       ;write message in DX
        jmp     Error_exit
C1_avail:
        mov     Baseadr,AX
        cmp     Byte ptr DS:[80h],0     ;are there parameters?
        jne     Get_params
        Call    Check_load              ;"Load_where" is set for mem location
        Display Sign_on
        lea     DX,Null_message
        jmp     No_parms
Get_params:
        call    Parameters              ;check for Sound, NoSound,
        cmp     AX,-1
        jne     No_error
        jmp     Error_exit              ;exit if errors i.e. AX=-1
```

```
No_error:
      cmp     AX,0                        ;AX=1 returns if uninstall is requested
      je      No_parms
      jmp     Uninstall_exit
No_parms:
      cmp     Load_where,0
      jne     Second_exit                 ;CF is returned if already loaded
      jmp     First_load                  ;not loaded, so load
Second_exit:
      call    Init_port
Uninstall_exit:
      Doscall 9                           ;write message in DX
      mov     AH,4cH
      mov     AL,0                        ;terminate with errorcode 0
      int     21h Null_message:       db   '$'
No_com_message:
db     '                    No Asychronous Ports are available!',cr,lf,'$'
No_c2_message:
db     '                    Asychronous Port2 is not available!',cr,lf,'$'
Not_installed:
db     '                    DataPad is  NOT  Installed!',cr,lf,'$'
Disabled_message:
db     '                    DataPad has been Disabled!',cr,lf,'$'
Uninstalled_message:
db     '                    DataPad has been Uninstalled!',cr,lf,'$'
Sound_on_message:
db     '                DataPad Sound feedback has been Enabled!',cr,lf,'$'
Sound_off_message:
db     '                DataPad Sound feedback has been Disabled!',cr,lf,'$'
NL_rev_message:
db     '               NOTE:  The Character sets have been reversed!',cr,lf,'$'

First_load:
      mov     ah,9h                       ;DX passed by other routines
      int     21h                         ;print message
      mov     SI,offset Old_int_vector    ;pointer for saving old vector
      mov     AL,Int_number
      Doscall 35                          ;get interrupt vector
      mov     [SI],BX
      mov     [SI+2],ES                   ;save interrupt vector
      Lea     DX,INT_HANDLER              ;Address the routine
      mov     AL,Int_number
      Mov     AH,25                       ;Set the vector
      Int     21                          ;Call DOS to do it
      call    Init_port
      Lea     DX,Res_end                  ;End of resident section
      Int     27                          ;For DOS 1.0 Compatibility Error_exit:
      mov     ax,4c01h                    ;exit back to MS-DOS
      int     21h                         ;with a "return code" of one ;****************
;the following will initialize the port
INIT_PORT   Proc     near
      Save    DS,DX,SI,DI,BX              ;Save all required regs
      Push    CS                          ;Place CS on stack so...
      Pop     DS                          ;...we can set DS
      Mov     DX,Baseadr                  ;Get port base address
      add     DX,3
      In      AL,DX                       ;Get the reg in AL
      Or      AL,80                       ;Turn on Divisor Latch Bit
      Out     DX,AL                       ;Enable the latch
      Sub     DX,3                        ;Point back to base port
```

```
        Mov     AX,Divisor
        Out     DX,AL                   ;Set into the divisor latch
        Mov     AL,AH
        Inc     DX                      ;Point to the high order port
        Out     DX,AL                   ;And set latch high order
        Inc     DX                      ;Now back to the...
        Inc     DX                      ;...DLAB bit
        Mov     AL,3                    ;Get the original parms in AL
        Out     DX,AL                   ;And set the other parms in the LCR
        Push    DX                      ;Save base address on stack
        Mov     DX,21                   ;Address interrupt control reg
        In      AL,DX                   ;Get current interrupts
        Mov     BL,Mask_P21
        Not     BL                      ;this will enable the
        And     AL,BL                   ;...the proper COM interrupt
        Out     DX,AL                   ;Put it back out
        Pop     DX                      ;Restore base addr from stack
        Inc     DX                      ;Point to Modem Control Reg
        Mov     AL,Out2+Rts+Dtr         ;RTS and DTR
        Out     DX,AL                   ;Set the Modem Control Reg
        Sub     DX,3                    ;Back up to Interrupt Enable Reg
        In      AL,DX                   ;Port might already be set.
        Or      AL,Dat_aint
        Out     DX,AL                   ;Set the reg
        Nop                             ;Allow dummy machine cycle
        restore
        ret
INIT_PORT endp ;**********
;the following will check if the program is already loaded and will
;not reload Check_load  proc    near
        assume    cs:_comm, DS:_comm, ES:nothing, SS:_comm xor     AX,AX                   ;so that AX=0 on return ie no errors
        save    SI,DX,AX
        mov     word ptr [Sign_on] + 51d,0    ; modify to avoid false alarm
        mov     BX,600h                 ;start search
        mov     AX,CS                   ;AX = end of search
        cld
        cli
Next_para:
        inc     BX                      ;next para
        cmp     AX,BX                   ;if current para ..
        mov     ES,BX                   ;set search seg
        jne     NP
        jmp     end_search              ;Not loaded
NP:
        mov     SI,offset Sign_on + 41d       ;compare sign on
        mov     DI,SI                   ;offset is the same
        mov     CX,23d                        ;only the first 23 bytes
        repe    cmpsb                   ;comp DS:SI to ES:DI
        jnz     Next_para
        sti
        mov     Load_where,ES           ;store memory location of loaded version
        xor     AH,AH
        mov     AL,Int_number
        shl     AL,1
        shl     AL,1
        add     AX,2
        mov     SI,AX
        xor     AX,AX
        mov     ES,AX
        cmp     BX,ES:[SI]              ;are the vectors the same?
        push    BX
```

```
        pop     ES
        jz      Vector_ok
        cmp     Byte ptr DS:[80h],0         ;are there parameters?
        jz      No_params
        mov     SI,80h                      ;location of parameters
        mov     CL,[SI]                     ;length of parameters
        xor     CH,CH                       ;16 bit
        inc     SI                          ;point to next byte
        cld                                 ;forward direction
Get_Parameters:
        lodsb                               ;load a byte into AL
        cmp     AL,"/"
        je      If_U                        ;jump if it is
        loop    Get_Parameters              ;continue of check parameters
        jmp     short No_params
If_U:
        and     byte ptr [SI],0dfh          ;change to upper case
        cmp     byte ptr [SI],"U"           ;is it U(ninstall)
        mov     ES:Uninstall_OK_flag,1      ;not safe to uninstall later!
        jz      Vector_ok ;If Uninstall was not requested,
;the following points the Int vector BACK to the async routine
;which has been taken by some other program.  It then sets a flag
;which indicates that it is not safe to "unload" in the future No_params:
        push    BX
        Saveint Int_number,old_int_vector
        push    ES                          ;vector seg
        pop     AX
        pop     ES
        mov     ES:[SI],BX                  ;save offset old vector in LOADED program
        mov     ES:[SI+2],AX                ;save seg old vector in LOADED program
        push    DS
        push    ES                          ;DataPad seg from check_load
        pop     DS
        mov     DX,offset INT_HANDLER
        mov     AH,25h
        mov     AL,Int_number
        int     21h                         ;set interrupt vector
        pop     DS
        mov     ES:Uninstall_OK_flag,1      ;not safe to uninstall later!
Vector_ok:
        mov     ES:Disable_flag,0           ;equals enabled
        restore
        ret
End_search:
        sti
        restore
        ret Check_load endp
;************************************

PARAMETERS proc     near mov SI,80h                              ;location of parameters
    mov CL,[SI]                             ;length of parameters
    xor CH,CH                               ;16 bit
    inc SI                                  ;point to next byte
    cld                                     ;forward direction
```

```
Parameters1:
    lodsb                               ;load a byte into AL
    cmp     AL,"/"
    je      Parameters2                 ;jump if it is
    loop    Parameters1                 ;continue of check parameters
    call    Check_load
    lea     DX,Sign_on
    ret Parameters2:
    cmp byte ptr [SI],"2"               ;is it COM2?
    jne     PR
    push    ES
    mov     AX,40h                      ;BIOS
    mov     ES,AX
    mov     AX,ES:[2]                   ;address of COM2
    pop     ES
    cmp     AX,0
    jne     C2_avail
    lea     DX,No_c2_message
    Doscall 9
    mov     AX,-1
    ret C2_avail:
    mov     Baseadr,AX
    mov     AL,8
    mov     Mask_P21,AL                 ;enable IRQ3 (COM2)
    mov     AL,0bh
    mov     Int_number,AL
    mov     byte ptr [Sign_on] + 42d,"2" ;modify for COM2 for Check_load
    inc     SI
    cmp byte ptr [SI],0dh               ;the end of parameters?
    jne     PR
    lea     Dx,Sign_on
    call    Check_load
    ret
PR:
    call    Check_load
    and byte ptr [SI],0dfh              ;change to upper case
    cmp byte ptr [SI],"S"               ;is it S(ound on)
    je      Sound_on
    cmp byte ptr [SI],"N"               ;is it O(ff, sound)
    je      Sound_Off
    cmp byte ptr [SI],"U"               ;is it U(ninstall)
    je      Uninstall
    cmp byte ptr [SI],"X"               ;is it eXchange the character sets
    jne     Nn1
    jmp     Num_lock_rev
Nn1:
    cmp byte ptr [SI],"R"               ;is it R(ename)?
    jne     PR1
    inc     SI
    and byte ptr [SI],0dfh              ;change to upper case
    cmp byte ptr [SI],"M"               ;is it M(onochrom)?
    jne     No_m
    inc     mode                        ;1=mono
No_m:
    call    Rename
    ret PR1: lea    DX,Sign_on
    xor     AX,AX
    ret
```

```
Sound_on:
    mov Sound_flag,1
    Display Sign_on
    mov     DX,offset Sound_on_message
    cmp     Load_where,0
    jne     Sor
    xor     AX,AX
    ret
Sor:
    mov     ES,Load_where
    mov     ES:Sound_flag,1
    xor     AX,AX
    ret Sound_off:
    mov     Sound_flag,0
    Display Sign_on
    mov     DX,offset Sound_off_message
    cmp     Load_where,0
    jne     Sor1
    xor     AX,AX
    ret
Sor1:
    mov     ES,Load_where
    mov     ES:Sound_flag,0
    mov     DX,offset Sound_off_message
    xor     AX,AX
    ret
Uninstall:
    cmp     Load_where,0
    jne     Go_uninstall
    mov     DX,offset Not_installed
    xor     AX,AX
    ret
Go_uninstall:
    mov     ES,Load_where
    cmp     ES:Uninstall_OK_flag,0      ;is it safe to uninstall?
    je          Uninstall_ok
    mov     ES:Disable_flag,1           ;1 = disabled
    push    DS
    mov     AL,Int_number               ;put back old interrupt vector
    mov     DX,ES:word ptr old_int_vector ;pointer to old vector seg
    mov     DS,ES:word ptr old_int_vector+2    ;pointer to old vector offset
    pop     DS
    mov     DX,offset Disabled_message
    mov     AX,1
    ret
Uninstall_ok:
    push    DS
    mov     AL,Int_number               ;put back old interrupt vector
    mov     DX,ES:word ptr old_int_vector ;pointer to old vector seg
    mov     DS,ES:word ptr old_int_vector+2    ;pointer to old vector offset
    Doscall 25h
    push    ES
    mov     ES,ES:[2Ch]                 ;get seg of environment
    Doscall 49h                         ;free it
    pop     ES
    Doscall 49h                         ;release program memory
    pop     DS
    mov     DX,Baseadr
    inc     DX                          ;Interrupt enabled reg
    xor     AL,AL
    out     DX,AL                       ;disable interrupts
    add     DX,3                        ;Modem control reg(Baseadr+4)
    out     DX,AL                       ;turn-off port
    mov     AX,1
    mov     DX,offset uninstalled_message
    ret
```

```
Num_lock_rev:
    cmp     Load_where,0
    jne     Nlr1
    cld                                 ;work up
    lea     SI,Transtable
    lea     DI,File_buffer
    mov     CX,12d                      ;# of keys
    rep movsw
    lea     SI,Transtable_2
    lea     DI,Transtable
    mov     CX,12d                      ;# of keys
    rep movsw
    lea     SI,File_buffer
    lea     DI,Transtable_2
    mov     CX,12d                      ;# of keys
    rep movsw
    Display Sign_on
    lea     DX,NL_rev_message
    xor     AX,AX
    ret
Nlr1:
    push    ES                          ;mem location of loaded prog
    pop     DS
    push    CS
    pop     ES
    cld                                 ;work up
    lea     SI,Transtable
    lea     DI,File_buffer
    mov     CX,12d                      ;# of keys
    rep movsw
    push    DS
    pop     ES
    lea     SI,Transtable_2
    lea     DI,Transtable
    mov     CX,12d                      ;# of keys
    rep movsw
    push    CS
    pop     DS
    lea     SI,File_buffer
    lea     DI,Transtable_2
    mov     CX,12d                      ;# of keys
    rep movsw
    Display Sign_on
    lea     DX,NL_rev_message
    xor     AX,AX
    ret parameters    endp
;**************************** rename        proc    near
    display Sign_on
    display Continue_message
    mov     AH,0                        ;get keyboard input
    int     16h
    call    keypad_display_initialize
    cmp     AX,-1
    je      Rename_error
    jmp     skip2
Rename_error:
    ret
Continue_message   db cr,lf,'                    Press any key to begin renaming the key
Error_message1 db cr,lf,lf,'ERROR!  #100',cr,lf,'$'
Error_message2 db cr,lf,lf,'Not enough room on disk!  No backup copy made. Program
aborted.',cr,lf,'$'
Error_message3 db cr,lf,lf,'ERROR #300',cr,lf,'$'
```

```
Error_message4 db cr,lf,lf,'ERROR.  DataPad.com not found in current directory.',cr,lf,
Pic_not_found  db cr,lf,lf,'ERROR.  DataPad.pic(m) not found in current directory.',cr,
Pic_read_error db cr,lf,lf,'ERROR.  DataPad.pic read error.',cr,lf,lf,'$'
Message_4      db 'Is the above correct? (Y/N)   $'
Message_5      db cr,lf,lf,'   Press <RETURN> to repeat the renaming procedure '
           db 'or <A> to ABORT. ',cr,lf,'$'
Message_7      db cr,lf,'.              The KeyPad has NOT been reprogrammed.
',cr,lf,lf,'$'
Message_8      db 'Do you want these changes to be permanent? (Y/N)   $'
Message_9      db 'Do you want Sound? (Y/N)   $'
Top_box        db 'èèèèèèèèèèèèèèèèèèèèèèèèèèèèèèèèèèèèèèèèèèèèèèèèèèèèèèè£$'
Message_6      db '¤         DataPad Version 1.0 has been installed.      ¤$'
Message_61     db '¤           Please make note of the above changes.     ¤$'
Bottom_box     db 'àèèèèèèèèèèèèèèèèèèèèèèèèèèèèèèèèèèèèèèèèèèèèèèèèèèèèèèè¥$'
Blank_line     db '                                                       $'
Blank          db '         $'
None           db '(none)$'
Toggle_message db 'What key(s) would you like to "toggle" to the numeric keyboard?  $'
Input_message  db 'Input the key that you would like to change the "0" to?  $'
record_size Equ    512d
file_buffer    db       Record_size dup(?)
handle1        dw   0
handle2        dw   0
file1          db   'DataPad.com',0
file2          db   'DataPad.bak',0
Carriage_return db '<CR>        $'
Escape         db '<ESC>       $'
Plus           db '+           $'
Space          db '<Space>     $'
Tab            db '<Tab>       $'
Backspace      db '<BackSpace>$'
Null           db '<Null>      $'
Unknown_key db 'Unknown      $'
Att_key1       db   7                   ;key # "blinking"
Att_key2       db   7                   ;key # "non-blinking"
Att_key3       db   7                   ;key # "blinking" message
Att_key4       db   7                   ;message line
Att_key5       db   7                   ;key value to be changed
Att_key6       db   7                   ;all other key values
Toggle_location dw 113dh
Function_table1 label    byte
     DB   '<Shift-Tab>    $'
     DB   '<Alt-Q>        $'
     DB   '<Alt-W>        $'
     DB   '<Alt-E>        $'
     DB   '<Alt-R>        $'
     DB   '<Alt-T>        $'
     DB   '<Alt-Y>        $'
     DB   '<Alt-U>        $'
     DB   '<Alt-I>        $'
     DB   '<Alt-O>        $'
     DB   '<Alt-P>        $'
Function_table2 label    byte
     DB   '<Alt-A>        $'
     DB   '<Alt-S>        $'
     DB   '<Alt-D>        $'
     DB   '<Alt-F>        $'
     DB   '<Alt-G>        $'
     DB   '<Alt-H>        $'
     DB   '<Alt-J>        $'
     DB   '<Alt-K>        $'
     DB   '<Alt-L>        $'
```

```
Function_table3  label    byte
        DB   '<Alt-Z>         $'
        DB   '<Alt-X>         $'
        DB   '<Alt-C>         $'
        DB   '<Alt-V>         $'
        DB   '<Alt-B>         $'
        DB   '<Alt-N>         $'
        DB   '<Alt-M>         $'
Function_table4  label    byte
        DB   '<F1>            $'
        DB   '<F2>            $'
        DB   '<F3>            $'
        DB   '<F4>            $'
        DB   '<F5>            $'
        DB   '<F6>            $'
        DB   '<F7>            $'
        DB   '<F8>            $'
        DB   '<F9>            $'
        DB   '<F10>           $'
Function_table5  label    byte
        db   '<Home>          $'
        db   '<Up Arrow>      $'
        db   '<PgUp>          $'
        db   '<NP ->          $'
        db   '<Left Arrow>    $'
        db   '<NP-5>          $'
        db   '<Right Arrow>   $'
        db   '<NP +>          $'
        db   '<End>           $'
        db   '<Dn Arrow>      $'
        db   '<PgDn>          $'
        db   '<Ins>           $'
        db   '<Del>           $'
        DB   '<Shift-F1>      $'    ;AH=84d
        DB   '<Shift-F2>      $'
        DB   '<Shift-F3>      $'
        DB   '<Shift-F4>      $'
        DB   '<Shift-F5>      $'
        DB   '<Shift-F6>      $'
        DB   '<Shift-F7>      $'
        DB   '<Shift-F8>      $'
        DB   '<Shift-F9>      $'
        DB   '<Shift-F10>     $'
        DB   '<Ctrl-F1>       $'    ;AH=94d
        DB   '<Ctrl-F2>       $'
        DB   '<Ctrl-F3>       $'
        DB   '<Ctrl-F4>       $'
        DB   '<Ctrl-F5>       $'
        DB   '<Ctrl-F6>       $'
        DB   '<Ctrl-F7>       $'
        DB   '<Ctrl-F8>       $'
        DB   '<Ctrl-F9>       $'
        DB   '<Ctrl-F10>      $'
        DB   '<Alt-F1>        $'    ;AH=104
        DB   '<Alt-F2>        $'
        DB   '<Alt-F3>        $'
        DB   '<Alt-F4>        $'
        DB   '<Alt-F5>        $'
        DB   '<Alt-F6>        $'
        DB   '<Alt-F7>        $'
        DB   '<Alt-F8>        $'
        DB   '<Alt-F9>        $'
        DB   '<Alt-F10>       $'
        DB   '<Ctrl-PrtSc>    $'    ;AH=114d
        DB   '<Ctrl-LftArrow>$'
        DB   '<Ctrl-RtArrow> $'
        DB   '<Ctrl-End>      $'
```

```
        DB      '<Ctrl-PgDn>    $'
        DB      '<Ctrl-Home>    $'
        DB      '<Alt-1>        $'              ;AH=120d
        DB      '<Alt-2>        $'
        DB      '<Alt-3>        $'
        DB      '<Alt-4>        $'
        DB      '<Alt-5>        $'
        DB      '<Alt-6>        $'
        DB      '<Alt-7>        $'
        DB      '<Alt-8>        $'
        DB      '<Alt-9>        $'
        DB      '<Alt-0>        $'              ;AH=129D
        DB      '<Alt-Hyphen>   $'
        DB      '<Alt- =>       $'
        DB      '<Ctrl-PgUp>    $'              ;AH=132d
skip2:
        mov     DL,30h                  ;ascii value of first key
        mov     CX,25bh                 ;offset into DP_PIC buffer for
                                        ;... first key name attribute
        xor     AX,AX
        push    AX
        pop     SI
        xor     BP,BP
        call    Showfile
        cmp     AX,-1
        jne     repeat
        ret
repeat:
        inc     SI                      ;for NEXT key
        mov     AH,0                    ;get keyboard input
        int     16h
        cmp     AX,0                    ;Ctrl-Break ??
        jne     N_CB
        mov     AX,-1
        ret
N_CB:
        cmp     AL,0Ah                  ;ctrl - carriage return
        jne     Ascii                   ;equals a
        xor     AX,AX                   ;Null character
Ascii:
        mov     Word ptr Transtable[BP],AX    ;store scan/ascii codes in buffer
        cmp     AL,0
        jne     Skip1
        jmp     Skip19
Skip1:
        cmp     AH,28d
        jne     Skip11
        mov     BL,Att_Key6
        call    Write_att
        push    BP
        mov     CX,11d
        mov     BP,offset Carriage_return
        call    DISPLAY_STR
        pop     BP
        jmp     Continue
Skip11:
        cmp     AH,1
        jne     Skip12
        mov     BL,Att_Key6
        call    Write_att
        push    BP
        mov     CX,11d
        mov     BP,offset Escape
        call    DISPLAY_STR
        pop     BP
        jmp     Continue
```

```
Skip12:
        cmp     AH,57d
        jne     Skip4
        mov     BL,Att_Key6
        call        Write_att
        push        BP
        mov     CX,11d
        mov     BP,offset Space
        call        DISPLAY_STR
        pop     BP
        jmp     Continue
Skip4:
        cmp     AH,15d
        jne     Skip5
        mov     BL,Att_Key6
        call        Write_att
        push        BP
        mov     CX,11d
        mov     BP,offset Tab
        call        DISPLAY_STR
        pop     BP
        jmp     Continue
Skip5:
        cmp     AH,14d
        jne     Skip6
        mov     BL,Att_Key6
        call        Write_att
        push        BP
        mov     CX,11d
        mov     BP,offset Backspace
        call        DISPLAY_STR
        pop     BP
        jmp     Continue
Skip6:
        cmp     AL,0                            ;jump to print if not special function
        je      Skip15
        jmp     Skip20
Skip15:
        cmp     AH,78d
        jne     Skip19
        mov     BL,Att_Key6
        call        Write_att
        push        BP
        mov     CX,11d
        mov     BP,offset Plus
        call        DISPLAY_STR
        pop     BP
        jmp     Continue
Skip19:
        cmp     AH,0
        jne     Skip191
        mov     BL,Att_Key6
        call        Write_att
        push        BP
        mov     CX,11d
        mov     BP,offset Null
        call        DISPLAY_STR
        pop     BP
        jmp     Continue
Skip191:
        cmp     AH,15d
        jae     skip192
        jmp     Unknown
```

```
Skip192:
        cmp     AH,25d
        ja      Test_table2
        push            AX
        mov     AH,9
        mov     BL,Att_key6
        mov     CX,1                    ;1 character
        int     10h
        xor     BX,BX
        pop     AX
        mov     BL,AH
        sub     BL,15d
        mov     CX,4
        shl     BL,CL
        push            BP
        lea     BP,Function_table1[BX]
        mov     BL,Att_key2
        mov     CX,13d                  ;# of characters
        call            DISPLAY_STR
        pop     BP
        jmp     Continue
Test_table2:
        cmp     AH,30d
        jae     TT2
        jmp     Unknown
TT2:    cmp     AH,38d
        ja      Test_table3
        push            AX
        mov     BL,Att_Key6
        call            Write_att
        xor     BX,BX
        pop     AX
        mov     BL,AH
        sub     BL,30d
        mov     CX,4
        shl     BL,CL
        push            BP
        lea     BP,Function_table2[BX]
        mov     BL,Att_key2
        mov     CX,14d                  ;# of characters
        call            DISPLAY_STR
        pop     BP
        jmp     Continue
Test_table3:
        cmp     AH,44d
        jae     TT3
        jmp     Unknown
TT3:
        cmp     AH,50d
        ja      Test_table4
        push            AX
        mov     BL,Att_Key6
        call            Write_att
        xor     BX,BX
        pop     AX
        mov     BL,AH
        sub     BL,44d
        mov     CX,4
        shl     BL,CL
        push            BP
        lea     BP,Function_table3[BX]
        mov     BL,Att_key2
        mov     CX,14d                  ;# of characters
        call            DISPLAY_STR
        pop     BP
        jmp     Continue
```

```
Test_table4:
        cmp     AH,59d
        jb      Unknown
        cmp     AH,68d
        ja      Test_table5
        push            AX
        mov     AH,9
        mov     BL,Att_key6
        mov     CX,1                    ;1 character
        int     10h
        xor     BX,BX
        pop     AX
        mov     BL,AH
        sub     BL,59d
        mov     CX,4
        shl     BL,CL
        push            BP
        lea     BP,Function_table4[BX]
        mov     BL,Att_key2
        mov     CX,5d                   ;# of characters
        call            DISPLAY_STR
        pop     BP
        jmp     Continue
Test_table5:
        cmp     AH,71d
        jb      Unknown
        cmp     AH,132d
        ja      Unknown
        push            AX
        mov     AH,9
        mov     BL,Att_key6
        mov     CX,1                    ;1 character
        int     10h
        xor     BX,BX
        pop     AX
        mov     BL,AH
        sub     BL,71d
        mov     CL,4
        shl     BX,CL
        push            BP
        lea     BP,Function_table5[BX]
        mov     BL,Att_key2
        mov     CX,14d                  ;# of characters
        call            DISPLAY_STR
        pop     BP
        jmp     Continue
Unknown:
        mov     AX,offset Unknown_key
        mov     AH,9
        int     21h
        jmp     Continue
Skip20:
        mov     BL,Att_Key6
        call            Write_att
        mov     DX,SI
        mov     DH,DL
        add     DH,2                    ;row
        mov     DL,3eh                  ;column
        call            Move_cursor
Continue:
        push            BP
        mov     BP,offset Blank         ;write space
        mov     CX,0dh                  ;# to write
        call            DISPLAY_STR
        pop     BP
        inc     BP
        inc     BP
```

```
              cmp       SI,12d                          ;have we exceeded the # of keys?
              je        Correct
              call      CHANGE_PIC
              jmp       repeat                          ;if not, repeat loop
Correct:
              dec       SI
              push      SI
              shl       SI,1
              mov       DX,Location_table[SI]           ;turn off blinking attribute of
              call      Move_cursor                     ;last key
              pop       SI
              mov       AL,"B"
              mov       AH,9                            ;write attr. & character
              mov       BL,Att_key2                     ;attr.
              mov       CX,1
              int       10h
              mov       DX,1606h                        ;row 22, column
              call      Move_cursor
              mov       CX,65d
              mov       BP,offset Toggle_Message
              call      DISPLAY_STR
Beg_tl:
              mov       DX,1647h                        ;row 22, column 69
              call      Move_cursor
              mov       AH,8                            ;character input
              int       21h
              cmp       AL,0dh                          ;CR
              jne       TS
              mov       DX,Toggle_location
              call      Move_cursor
              mov       CX,6d
              mov       BP,offset None                  ;display the "none" word
              call      DISPLAY_STR
              mov       Toggle_key1,-1
              mov       Toggle_key2,-1
              jmp       Reset
TS:
              cmp       AL,30h
              jb        T0
              cmp       AL,3ah
              jb        Toggle_1

T0:           and       AL,0dfh                         ;capitalize
              cmp       AL,"A"
              jne       TB
              mov       Toggle_key1,":" - 30h
              jmp short T1C
TB:           cmp       AL,"B"
              jne       Beg_tl
              mov       Toggle_key1,";" - 30h
              jmp short T1C
Toggle_1:
              sub       AL,30h
              mov       Toggle_key1,AL
              add       AL,30h
T1C:          mov       DX,Toggle_location
              call      Move_cursor
              mov       CX,6d
              mov       BP,offset Blank_line            ;blank the "none" word
              call      DISPLAY_STR
              mov       DX,Toggle_location
              add       Toggle_location,1
              call      Move_cursor
              mov       AH,0Eh                          ;print character WITH ATT
              xor       BX,BX
              int       10h
```

```
Toggle_2:
        mov     DX,1647h                ;row 22,   column 69
        call    Move_cursor
        mov     AH,8                            ;character input
        int     21h
        cmp     AL,0dh                  ;CR
        jne     TS2
        jmp     Reset
TS2:
        cmp     AL,30h
        jb      T02
        cmp     AL,3ah
        jb      T22
T02:
        and     AL,0dfh                 ;capitalize
        cmp     AL,"A"
        jne     TB2
        mov     Toggle_key2,":" - 30h
        jmp short T2C
TB2:    cmp     AL,"B"
        jne     Toggle_2
        mov     Toggle_key2,";" - 30h
        jmp short T2C
T22:
        sub     AL,30h
        mov     Toggle_key2,AL
        add     AL,30h
T2C:    mov     DX,Toggle_location
        call    Move_cursor
        cmp     Toggle_key1,-1
        jne     NB
        mov     CX,6d
        mov     BP,offset Blank_line    ;blank the "none" word
        call    DISPLAY_STR
        mov     DX,Toggle_location
        call    Move_cursor
        jmp     YB
NB:     mov     DX,Toggle_location
        call    Move_cursor
        push    AX
        mov     AX,0e2ch                ;write ","
        int     10h
        mov     AX,0e20h                ;write " "
        int     10h
        pop     AX
YB:     mov     AH,0ah
        xor     BX,BX
        mov     CX,1
        int     10h
Reset:
        mov     AH,9h                   ;print string
        mov     DX,1605h                ;row 23,   column 5
        mov     BP,offset Blank_line
        mov     BL,att_key3
        call    Write_str
        mov     DX,160Fh
        mov     BP,offset Blank_line
        mov     BL,att_key3
        call    Write_str
        mov     DX,1617h                ;row 23,   column 17
        mov     BP,offset Message_4             ;ask all is correct
        mov     BL,att_key3
        call    Write_str
        mov     AH,3                    ;read cursor position
        xor     BH,BH
        int     10h
        dec     DL                      ;move cursor back 1
```

```
        mov     AH,2                            ;set cursor
        int     10h
        mov     AH,09                   ;write
        mov     AL,'Y'
        mov     BL,8fh                  ;blinking bold
        mov     CX,1
        int     10h
        mov     AH,0
        int     16h                     ;get scan code
        push            AX
        mov     AH,2
        mov     DL,AL
        int     21h                     ;print response
        mov     DX,1633h                ;row 23, column 17
        call            Move_cursor
        mov     AH,09                   ;write
        mov     AL,' '
        mov     BL,Att_key3                     ;blinking bold
        mov     CX,1
        int     10h
        pop     AX
        cmp     AH,1CH                  ;was CR pressed?
        je      S_finish                ;then goto finish
        cmp     AH,15H                  ;was Y pressed?
        je      S_finish                ;then goto finish
        cmp     AH,49d                  ;was no pressed
        je      Not_correct
        jmp     Correct                 ;only allow y or n
Not_correct:
        mov     DX,170ah                ;row 23, column 10
        call            Move_cursor
        mov     AH,9
        mov     DX,offset Message_5             ;ask to repeat or abort
        int     21h
        mov     AH,0                            ;get keyboard response
        int     16h                     ;get scan code
        cmp     AH,30d                  ;was the A key pressed
        jne     skip3
        jmp     exit_1
Skip3:
        mov     DL,30h
        mov     BP,0
        mov     Toggle_location,113dh
        jmp     skip2
S_Finish:
        mov     DX,160bh                ;row 23, column  5
        call    .  Move_cursor
        Display Blank_line
        mov     DX,1618h                ;row 23, column 27
        mov     BP,offset Message_9             ;DO YOU WANT SOUND
        mov     BL,att_key3
        call            Write_str
        mov     AH,3                            ;read cursor position
        xor     BH,BH
        int     10h
        dec     DL                      ;move cursor back 1
        mov     AH,2                            ;set cursor
        int     10h
        mov     AH,09                   ;write
        mov     AL,'Y'
        mov     BL,8fh                  ;blinking bold
        mov     CX,1
        int     10h
        mov     AH,0
        int     16h                     ;get scan code
        push            AX
        mov     AH,2
```

```
            mov     DL,AL                   ;print response
            int     21h
            pop     AX
            cmp     AH,15h                  ;was Y pressed?
            je      S_yes
            cmp     AH,1ch                  ;was CR pressed?
            je      S_yes
            cmp     AH,49d                  ; or N
            jne     S_Finish
            mov     Sound_flag,0
            jmp     Finish
S_yes:      mov     Sound_flag,1
Finish:
            mov     BL,Att_key3             ;normal attribute
            mov     DX,160bh
            mov     BP,offset Blank_line
            call    Write_str
            mov     DX,160fh                ;row 23,  column 10
            mov     BP,offset Message_8     ;make changes permanent
            mov     BL,att_key3
            call    Write_str
            mov     AH,3                    ;read cursor position
            xor     BH,BH
            int     10h
            dec     DL                      ;move cursor back 1
            mov     AH,2                    ;set cursor
            int     10h
            mov     AH,09                   ;write
            mov     AL,'N'
            mov     BL,8fh                  ;blinking bold
            mov     CX,1
            int     10h
            mov     AH,0
            int     16h                     ;get scan code
            push    AX
            mov     AH,2
            mov     DL,AL                   ;print response
            int     21h
            mov     BL,Att_key3             ;normal attribute
            mov     DX,160bh
            mov     BP,offset Blank_line
            call    Write_str
            pop     AX
            cmp     AH,15H                  ;was Y pressed?
            je      File_modify
            cmp     AH,31H                  ; or N
            je      F_exit
            cmp     AH,1cH                  ; or CR
            je      F_exit
            jmp     Skip21
F_exit:     jmp     Exit
Skip21:
            jmp     Finish
File_modify:
            mov     Ah,36h                  ;get free disk space
            mov     DL,0                    ;default drive
            int     21h
            mul     CX                      ;sectors/cluster * bytes/sector
            mul     BX                      ;available clusters = free bytes
            jc      FM1
            cmp     AX,11500d               ;is there enough room for file
            jb      Disk_full
FM1:        mov     DX,Location_table[0]    ;turn on blinking attribute of
            call    Move_cursor             ;first key
            mov     AX,0930h                ;ascii value
            mov     BL,Att_key1             ;attr.
            xor     BH,BH
```

```
        mov     CX,1
        int     10h
        mov     DX,033dh                ;mov to first key value att
        call        Move_cursor
        mov     AH,8                    ;read char & att
        xor     BH,BH                   ;page 0
        int     10h
        mov     BL,Att_key5             ;"blinking" attr byte
        mov     AH,9                    ;write char & attr.
        int     10h
        mov     DX,1605h                ;location of key # message
        call        Move_cursor
        mov     CX,67d
        xor     BH,BH                   ;page 0
        mov     BL,Att_key3
        mov     AX,0920h                ;write char & attr.
        int     10h
        mov     DX,160ch
        call        Move_cursor
        mov     BP,offset Input_message
        mov     CX,56d
        call        DISPLAY_STR
        mov     AX,3d02h                ;open DataPad.com for read/write
        mov     DX,offset file1
        int     21h
        jc      No_file
        mov     handle1,AX
        mov     AH,3ch                  ;create output file
        mov     CX,0                        ;attribute = normal
        mov     DX,offset file2
        int     21h
        jc      disk_full
        mov     handle2,AX
        jmp     Next_record
No_file:
        Display  Error_message4
        mov     AX,-1
        ret
Disk_full:
        Display  Error_message2
        mov     AX,-1
        ret
Next_record:                            ;copy Datapad.asm to Datapad.bak
        mov     AH,3fh                  ;sequential read
        mov     BX,handle1
        mov     Cx,Record_size
        mov     DX,offset file_buffer
        int     21h
        jc      Bad_copy
        cmp     AX,0                    ;check bytes transferred
        jz      File_end
        mov     CX,AX
        mov     AH,40h                  ;sequential write
        mov     BX,handle2
        mov     DX,offset File_buffer
        int     21h
        jc      Bad_copy
        cmp     AX,CX
        jne     Disk_full
        jmp     Next_record
Bad_copy:
        Display  Error_message3
        mov     AX,-1
        ret
File_end:
```

```
        mov     AH,3eh                          ;close output file
        mov     BX,handle2
        int     21h
        mov     AH,42h                          ;set pointer
        xor     AL,AL                           ;starting at the beginning
        mov     BX,handle1
        xor     CX,CX
        lea     DX,Transtable-100h              ;with this offset
        int     21h
        jc      error
        mov     AH,40h                          ;write
        mov     BX,handle1
        mov     CX,Transtable_2-Transtable      ;number of bytes
        mov     DX,offset Transtable
        int     21h
        mov     AH,3eh                          ;close
        mov     BX,handle1
        int     21h
        call            Save_screen
        mov     DX,Location_table[0]            ;turn off blinking attribute of
        call            Move_cursor                     ;first key
        mov     AX,0930h                        ;ascii value
        mov     BL,Att_key2                     ;attr.
        xor     BH,BH
        mov     CX,1
        int     10h
        mov     DX,033dh                        ;mov to first key value att
        call            Move_cursor
        mov     AH,8                            ;read char & att
        xor     BH,BH                           ;page 0
        int     10h
        mov     BL,Att_key6                     ;normal attr byte
        mov     AH,9                            ;write char & attr.
        int     10h
        jmp     Exit
error:
        mov     AH,9h                           ;print string
        mov     DX,offset error_message1
        int     21h
exit:
        mov     BL,Att_key4                     ;normal attribute
        mov     DX,1605h
        mov     BP,offset Blank_line
        call            Write_str
        mov     DX,1610h
        mov     BP,offset Blank_line
        call            Write_str
        mov     BL,0fh                          ;normal attribute
        mov     DX,140bh
        mov     BP,offset Top_box
        call            Write_str
        mov     DX,150bh
        mov     BP,offset Message_6
        call            Write_str
        mov     DX,160bh
        mov     BP,offset Message_61
        call            Write_str
        mov     DX,170bh
        mov     BP,offset Bottom_box
        call            Write_str
        cmp     Load_where,0
        je      Prog_modified                   ;not loaded modify program
        mov     SI,offset Transtable            ;offset of new key names
        mov     DI,SI                           ;offset to key names
        mov     ES,Load_where
        mov     CX,Transtable_2-Transtable
        rep     movsb
```

```
        stc
        lea    DX,Null_message
        ret
Prog_modified:
        clc
        lea    DX,Null_message
           ret
exit_1:
        lea    DX,Message_7
        mov    Ah,9h
        int    21h
           ret

RENAME     ENDP
;***********************************************************

DISPLAY_STR proc   near
;displays string with attributes same as at the cursor location
;call with: cursor at the desired location
;          CX=# of characters
;          ES:BP = seg:offset of string
    push    AX
    push    BX
    push    CX
    xor     BX,BX          ;page0
    mov     AH,3           ;read cursor location
    int     10h
    pop     CX
    pop     BX
Display_rep:
    mov     AL,[BP]
    mov     AH,0eh         ;write character & advance cursor location
    int     10h
    inc     BP
    dec     CX
    cmp     CX,0           ;have we process all characters?
    jne     Display_rep
Display_ret:
    pop     AX
    ret
DISPLAY_STR endp
;***********************************************************
;this set the "normal" att at the cursor position Write_att proc    near
        mov    AH,9
        mov    CX,1            ;1 character
        int    10h
        ret
Write_att endp
;***********************************************************

KEYPAD_DISPLAY_INITIALIZE proc      near
;displays a 4000-byte block indexed by DATA_SEGMENT and BUFFERPTR.

jmp        Display_initialize
bios_data         segment at 40h
                  org 63h
addr_6845    dw ?                        ;CRT Controller address
bios_data    ends
errmsg1      db ' File not found',cr,lf,'$'
errmsg2      db cr,lf,'Error reading  ',cr,lf,'$'
doscolor     db    ?                     ;color before
fileptr      dw 81h                      ;pointer to file name text
data_segment dw ?                        ;buffer segment
bufferptr    db 0                        ;pointer to current buffer page
mode         db 0                        ;0=color, 1=monochrome
```

```
columns         db  ?                           ;number of display columns -1
lcolumns        dw  ?                           ;number of display columns
crtc_addr       dw  ?                           ;CRT Controller base address
video_segment dw 0B800h                         ;video buffer segment
File3           db      'DataPad.pic',0,'$'
DP_PIC              db 4000d dup(0)
attribute       db  1fh                         ;current paint attribute
menu_attr       db  1bh                         ;menu line attribute
linelength      dw  ?
delta           dw  ?                           ;line length variable Display_initialize:
            push SI
            push CX
            cmp  mode,1                         ;Mode=1, Mono requested
            je   Mono ;Determine whether video is color or monochrome.
;
video:      push ds                             ;get address of CRT Controller
            mov ax,bios_data
            mov ds,ax
            assume ds:bios_data
            mov ax,addr_6845
            mov crtc_addr,ax                    ;save it
            pop ds
            test ax,40h                         ;is bit 6 of CRTC address set?
            jnz more_video                      ;yes, then it's a color adapter
            inc mode                            ;no, then it's monochrome
Mono:
            mov video_segment,0B000h            ;modify attributes for monochrome
            mov attribute,7
         mov menu_attr,7
            mov file3+10d,'m'                   ;file for monochrome screen
;
;Determine number of display columns, screen color, and video page number.
;
more_video: mov ah,0fh                          ;get number of columns and page
            int 10h
            mov al,ah
            xor ah,ah
            mov lcolumns,ax                     ;store number of columns
            mov linelength,ax                   ;store line length in bytes
            shl linelength,1
            dec al                              ;store number of columns - 1
            mov columns,al
         mov cl,79d                             ;determine number of bytes
            sub cl,al                           ;   from end of one line to
            shl cl,1                            ;   beginning of next
            xor ch,ch
            mov delta,cx
            cmp al,79d                          ;adjust if more than 80 columns
            jna no_adjust                       ;   are currently displayed
            mov columns,79d
            mov lcolumns,80d
            mov delta,0
no_adjust:  mov ah,8                            ;read current attribute
            int 10h
            mov doscolor,ah                     ;store it for use upon exit
            or bh,bh                            ;make sure page zero is active
            je Initialize_end
            mov ax,0500h                        ;activate it if it's not
            int 10h
Initialize_end:
            mov ax,3D00h                        ;request read-only access
            mov dx,offset File3                 ;point DS:DX to filespec
            int 21h
            jnc read_file                       ;branch if open succeeded
```

```
                Display     Error_message1
                Display File3                  ;print 'File not found'
                Display errmsg1                ;print 'File not found'
                mov    AX,-1                   ;return with AX = -1
                pop    CX
                pop    SI
;Read character/attribute data from the file.
;
read_file:      mov bx,ax                      ;transfer file handle to BX
                mov ah,3Fh                     ;read file data
                mov cx,4000d                   ;read 4000 bytes
                mov DX,offset dp_pic           ;point DX to beginning of segment
                int 21h
                jnc check_read                 ;branch if no error occurred
                mov dx,offset errmsg2          ;abort on read error
                mov    AX,-1
                pop    CX
                pop    SI
                ret
check_read:     or ax,ax                       ;abort if no bytes read
                jne close_file
                mov dx,offset errmsg2
                mov    AX,-1
                pop    CX
                pop    SI
                ret
close_file:     mov ah,3Eh                     ;close file
                int 21h
                pop    CX
                pop    SI
                ret
KEYPAD_DISPLAY_INITIALIZE        endp Location_Table    label word
        dw  0618h,061fh,0626h,062dh     ;column-row location of the numbers
        dw  0a18h,0a1fh,0a26h,0a2dh     ;in the Datapad.pic(m)
        dw  0e18h,0e1fh,0e26h,0e2dh ;----------------------------------------------------------------
;ShowFile displays a 4000-byte block indexed by DATA_SEGMENT and BUFFERPTR.
;----------------------------------------------------------------
ShowFile    proc    near
            push SI
            push CX
            mov ax,offset dp_pic           ;find starting buffer address
            mov si,ax                      ;transfer it to SI
            xor dx,dx                      ;set DX for home cursor position
            mov cx,25d                     ;25 display lines
show1:      push cx
            mov cx,lcolumns                ;number of display columns
show2:      push cx
            mov ah,2                       ;position the cursor
            int 10h
            lodsw                          ;get one C/A pair
            mov bl,ah                      ;transfer attribute to BL
            mov ah,9                       ;display character and attribute
            mov cx,1
            int 10h
            inc dl                         ;advance cursor
            pop cx
            loop show2                     ;loop until this line is done
            inc dh                         ;home cursor to start of next line
            xor dl,dl
            add si,delta                   ;adjust SI for other than 80 cols
            pop cx
            loop show1                     ;loop until 25 lines are done
```

```
        Call  Get_att
        mov   DX,033dh              ;row,column for key value
        call  Move_cursor
        xor   AX,AX
        pop   CX
        pop   SI
        ret                          ;and exit SHOWFILE  endp
;*******************************

CHANGE_PIC   proc   near             ;SI has the    key #
        push  SI
        shl   SI,1                   ;multiply by two for pointer
        mov   DX,Location_table[SI]
        pop   SI
        call  Move_cursor            ;row,column
        xor   BH,BH                  ;page 0
        mov   CX,1                   ;1 rep factor
        mov   AH,8                   ;read char & att
        int   10h
        mov   AH,9                   ;write attr. & character
        mov   BL,Att_key1            ;blinking attr.
        int   10h
        mov   DX,163dh               ;location of key # message
        call  Move_cursor
        mov   BL,Att_key3
        mov   AX,SI
        cmp   AX,0ah
        jb    Below_10
        cmp   AL,0bh
        jne   CP1
        mov   AL,42h                 ;"B"
        jmp   short    Above_10
CP1:    mov   AL,41h                 ;"A"
        jmp   short    Above_10
Below_10:
        add   AL,30h                 ;ascii value
Above_10:
        mov   AH,09h                 ;write character
        int   10h
        test  SI,SI
        jz    CP4
        push  SI
        dec   SI
        shl   SI,1
        mov   DX,Location_table[SI]
        pop   SI
        call  Move_cursor
        mov   AH,8                   ;read char & att
        int   10h
        mov   AH,9                   ;write attr. & character
        mov   BL,Att_key2            ;attr.
        int   10h
CP4:    mov   AX,SI                  ;key value
        mov   DH,AL
        add   DH,3                   ;row for key name
        mov   DL,3dh                 ;column for answer
        call  Move_cursor
        mov   AH,8                   ;read char & attri at cursor
        int   10h
        mov   BL,Att_key5            ;bold, blinking
        mov   AH,9                   ;write character & attri
        int   10h
        ret
CHANGE_PIC   Endp
;*******************************
```

```
MOVE_CURSOR proc      near          ;DH=Row, DL=Column
        push  BX
        push  AX
        xor   BH,BH         ;page 0
        mov   AH,2
        int   10h
        pop   AX
        pop   BX
        ret
MOVE_CURSOR Endp
;*****************************************

SAVE_SCREEN proc   near
            mov ax,3d01h                    ;open the file for writing
            xor cx,cx
          mov DX,offset file3
            int 21h
            push ax                         ;save file handle
          mov   AH,3        ;read cursor position
          xor   BH,BH
          int   10h
          push  DX
          call PutVideo                     ;copy video to data buffer
          mov   AH,2        ;restore cursor
          pop   DX
          int   10h
          mov cx,4000d
            mov ah,40h
            pop bx
            mov DX,offset dp_pic
            int 21h
            mov ah,3Eh                      ;close the file
            int 21h
            ret
SAVE_SCREEN endp ;----------------------------------------------------------------------
;PutVideo writes the current video page to the data buffer.
;----------------------------------------------------------------------
PUTVIDEO      proc near
              mov DI,offset DP_PIC     ;bufferptr
              xor bh,bh
              xor dx,dx
              mov cx,25              ;copy contents a line at a time
put2:         push cx
              mov cx,lcolumns
put3:         mov ah,2
              int 10h
              mov ah,8
              int 10h
              stosw
              inc dl
              loop put3
              add di,delta           ;adjust for other than 80 columns
              inc dh
              xor dl,dl
              pop cx
              loop put2
              ret
PutVideo      endp
;*****************************************
```

```
GET_ATT     proc    near
;This procedure get the relavant attributes from the DataPad screen files
    xor     BH,BH
    mov     AH,8                    ;read att
    mov     DX,0618h                ;row,column
    call    Move_cursor
    int     10h
    mov     Att_key1,AH
    mov     DX,061fh                ;row,column
    call    Move_cursor
    mov     AH,8                    ;read att
    int     10h
    mov     Att_key2,AH
    mov     DX,163dh                ;row,column
    call    Move_cursor
    mov     AH,8                    ;read att
    int     10h
    mov     Att_key3,AH
    mov     DX,1600h                ;row,column
    call    Move_cursor
    mov     AH,8                    ;read att
    int     10h
    mov     Att_key4,AH
    mov     DX,033dh                ;row,column
    call    Move_cursor
    mov     AH,8                    ;read att
    int     10h
    mov     Att_key5,AH
    mov     DX,043dh                ;row,column
    call    Move_cursor
    mov     AH,8                    ;read att
    int     10h
    mov     Att_key6,AH
    ret
GET_ATT     endp
;*******************************************

WRITE_STR   proc    near
    ;BL = attribute
    ;DX = starting location, row:column
    ;ES:BP = seg:offset of string - string MUST end in "$"

push    CS
    pop     ES                      ;make sure ES points to code
    mov     CX,1
    xor     BH,BH
WS1:
    mov     AH,9
    call    Move_cursor
    mov     AL,byte ptr ES:[BP]
    cmp     AL,"$"
    je      WS_exit
    int     10h
    inc     BP
    inc     DL
    jmp short   WS1
WS_exit:
    ret
WRITE_STR   endp
;***********************************************
Start   Endp                        ;End of procedure _comm   Ends
        End     Entry
```

While the invention has been specifically described with reference to particular aspects, features, and embodiments thereof, it will be apparent that other variations, modifications, and embodiments are possible, and accordingly, all such variations, modifications, and embodiments are to be regarded as being within the spirit and scope of the invention.

What is claimed is:

1. A data processing system for analyzing data contained on or visible through a two dimensional surface, comprising:
   (a) a digital computer; and
   (b) a keypad assembly for inputting alpha-numeric data into said digital computer, said keypad assembly comprising:
      (i) a housing having a substantially flat bottom surface and sized such that it may be manually grasped and moved by hand over a flat two dimensional surface in any direction on which said housing is supported by said housing flat bottom surface;
      (ii) a viewing port formed in said housing comprising a transparent viewing window enabling data contained on or visible through said two dimensional surface when in sliding contact with said housing bottom surface to be seen through said transparent viewing window; and
      (iii) a keypad secured and positioned in said housing at a location proximate but offset from said transparent viewing window, including:
         (a) a plurality of manually actuatable keys for entering alpha-numeric data;
         (b) signal processing means within said housing adapted when a selected key is pressed to generate selected alpha-numeric data dependent upon which key is pressed, said selected alpha-numeric data corresponding to data contained on or visible through said two dimensional surface; and
         (c) signal transmitting means operatively connecting in signal in signal transmission relationship said keypad keys to said digital computer enabling each respective key when actuated to send to said digital computer the said selected alpha-numeric data corresponding to the key pressed.

2. A data processing system according to claim 1, wherein said housing includes a manually rotatable collar, said transparent viewing window is mounted in said rotatable collar, and said viewing window includes a visual reference marker thereon thereby enabling said visual reference marker to be selectively oriented relative to said housing.

3. A data processing system according to claim 2, wherein said visual reference marker comprises a set of orthogonal cross-hairs secured to said transparent viewing window.

4. A data processing system according to claim 2, wherein said visual reference marker comprises a set of dimensional scale markings.

5. A data processing system according to claim 4, wherein said dimensional scale markings comprise Vernier scale markings.

6. A data processing system according to claim 1, wherein said keypad assembly includes a substantially planar sheet of material forming at least a portion of said housing flat bottom surface and said transparent viewing window is formed in said planar sheet of material.

7. A data processing system according to claim 1, wherein said digital computer includes an asynchronous port and said signal transmitting means include a coupling element operatively connecting in signal transmission relationship said keypad keys to said asynchronous port of said digital computer.

8. A data processing system according to claim 1 wherein said two dimensional surface contains data arranged in a number of columns and said keys are arranged by rows and a equal number of columns.

9. A data processing system according to claim 1 wherein said two dimensional surface comprises a DNA sequence gel having a number of tracts being analyzed and said keys are arranged in rows and a number of columns equal to the number of said tracts.

* * * * *